US011974234B2

(12) United States Patent
Gutman et al.

(10) Patent No.: US 11,974,234 B2
(45) Date of Patent: Apr. 30, 2024

(54) POWER REPORTING FOR NETWORK POWER MODIFICATION

(71) Applicant: QUALCOMM Incorporated, San Diego, CA (US)

(72) Inventors: Igor Gutman, Hod HaSharon (IL); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/571,382

(22) Filed: Jan. 7, 2022

(65) Prior Publication Data

US 2023/0224826 A1    Jul. 13, 2023

(51) Int. Cl.
*H04W 52/14* (2009.01)
*H04B 17/382* (2015.01)
*H04L 5/00* (2006.01)
*H04W 52/36* (2009.01)

(52) U.S. Cl.
CPC ........ *H04W 52/365* (2013.01); *H04B 17/382* (2015.01); *H04L 5/0051* (2013.01)

(58) Field of Classification Search
None
See application file for complete search history.

(56) References Cited

U.S. PATENT DOCUMENTS

| | | | | |
|---|---|---|---|---|
| 9,949,237 | B2* | 4/2018 | Koskela | H04W 76/28 |
| 2005/0089123 | A1* | 4/2005 | Spiegel | H04L 27/3863 |
| | | | | 375/345 |
| 2007/0275680 | A1* | 11/2007 | Kaiki | H04L 27/3863 |
| | | | | 455/184.1 |
| 2010/0008230 | A1* | 1/2010 | Khandekar | H04W 72/02 |
| | | | | 370/329 |

FOREIGN PATENT DOCUMENTS

| | | | | |
|---|---|---|---|---|
| JP | 5373076 | B2 * | 12/2013 | H04W 16/10 |
| WO | WO-2023028849 | A1 * | 3/2023 | |

* cited by examiner

*Primary Examiner* — Ajit Patel
(74) *Attorney, Agent, or Firm* — Holland & Hart LLP

(57) ABSTRACT

Methods, systems, and devices for including power reporting for network power modification are described. That is, a user equipment (UE) and a base station may exchange signaling supporting an MPR update at the UE. In some examples, the UE may transmit, to the base station, a request for resources for performing channel measurements in accordance with a power reduction update associated with the UE. In response, the UE may receive, from the base station, an indication of a set of resources. In some examples, the UE may perform one or more channel measurements using the set of resources based on receiving the indication of the set of resources. In such examples, the UE may transmit, to the base station, a report indicating one or more power parameters associated with the power reduction update based on the one or more channel measurements.

30 Claims, 16 Drawing Sheets

POWER REPORTING FOR NETWORK POWER MODIFICATION

FIELD OF TECHNOLOGY

The following relates to wireless communications, including power reporting for network power modification.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support power reporting for network power modification. Generally, the described techniques provide for a user equipment (UE) and a base station exchanging signaling supporting a maximum power reduction (MPR) update at the UE. In some examples, the UE may be configured to transmit a measurement resource request to the base station, requesting resources to measure for an MPR update. In such examples, the UE may use the requested resources to measure metrics associated with the MPR table. In some cases, the base station may transmit a measurement resource indication indicating resources for the UE to perform channel measurements associated with the MPR update. The UE may update the MPR table based on the channel measurements and may transmit a power headroom report (PHR) to the base station considering the updated MPR table. That is, the UE may transmit a PHR to the base station referencing one or more updated MPR numbers as described herein.

A method for wireless communication at a UE is described. The method may include transmitting, to a network entity, a request for resources for performing channel measurements in accordance with a power reduction update associated with the UE, receiving, from the network entity, an indication of a set of resources in response to the request, performing one or more channel measurements using the set of resources based on receiving the indication of the set of resources, and transmitting, to the network entity, a report that indicates one or more power parameters associated with the power reduction update based on the one or more channel measurements.

An apparatus for wireless communication at a UE is described. The apparatus may include a processor, memory coupled with the processor, and instructions stored in the memory. The instructions may be executable by the processor to cause the apparatus to transmit, to a network entity, a request for resources for performing channel measurements in accordance with a power reduction update associated with the UE, receive, from the network entity, an indication of a set of resources in response to the request, perform one or more channel measurements using the set of resources based on receiving the indication of the set of resources, and transmit, to the network entity, a report that indicates one or more power parameters associated with the power reduction update based on the one or more channel measurements.

Another apparatus for wireless communication at a UE is described. The apparatus may include means for transmitting, to a network entity, a request for resources for performing channel measurements in accordance with a power reduction update associated with the UE, means for receiving, from the network entity, an indication of a set of resources in response to the request, means for performing one or more channel measurements using the set of resources based on receiving the indication of the set of resources, and means for transmitting, to the network entity, a report that indicates one or more power parameters associated with the power reduction update based on the one or more channel measurements.

A non-transitory computer-readable medium storing code for wireless communication at a UE is described. The code may include instructions executable by a processor to transmit, to a network entity, a request for resources for performing channel measurements in accordance with a power reduction update associated with the UE, receive, from the network entity, an indication of a set of resources in response to the request, perform one or more channel measurements using the set of resources based on receiving the indication of the set of resources, and transmit, to the network entity, a report that indicates one or more power parameters associated with the power reduction update based on the one or more channel measurements.

Some examples of the method, apparatuses, and non-transitory computer-readable medium described herein may further include operations, features, means, or instructions for transmitting, to the network entity, a request for measurement assistance information for performing the one or more channel measurements and receiving, from the network entity, the measurement assistance information in response to the request for measurement assistance information.

In some examples of the method, apparatuses, and non-transitory computer-readable medium described herein, transmitting the request for measurement assistance information may include operations, features, means, or instructions for transmitting an indication of an information type of measurement assistance information, where the information type includes an error vector magnitude value, a signal to noise ratio, in-band emission information, out-of-band emission information, adjacent channel interference information, or any combination thereof.

In some examples of the method, apparatuses, and non-transitory computer-readable medium described herein, transmitting the request for measurement assistance information may include operations, features, means, or instructions for transmitting an indication of the request for measurement assistance information using one or more bits in the request for resources for performing channel measurements in accordance with the power reduction update associated with the UE.

In some examples of the method, apparatuses, and non-transitory computer-readable medium described herein, receiving the measurement assistance information may include operations, features, means, or instructions for receiving resource allocation information for the set of resources in the measurement assistance information, where the resource allocation information includes a number of resource blocks, a starting resource block, a power value, a modulation type, or any combination thereof.

In some examples of the method, apparatuses, and non-transitory computer-readable medium described herein, receiving the measurement assistance information may include operations, features, means, or instructions for receiving an indication of a pass-fail criteria for one or more measurements of the measurement assistance information.

Some examples of the method, apparatuses, and non-transitory computer-readable medium described herein may further include operations, features, means, or instructions for receiving, in response to the report, an indication of one or more updated power reduction values for the UE, the one or more updated power reduction values based on the one or more power parameters.

In some examples of the method, apparatuses, and non-transitory computer-readable medium described herein, the one or more updated power reduction values may be based on a geographical location associated with the UE, a time of day, a network load, or any combination thereof.

Some examples of the method, apparatuses, and non-transitory computer-readable medium described herein may further include operations, features, means, or instructions for receiving, from the network entity, a message indicating a configuration for performing channel measurements in accordance with the power reduction update associated with the UE and selecting, based on the configuration, a subset of the set of resources for performing the one or more channel measurements.

Some examples of the method, apparatuses, and non-transitory computer-readable medium described herein may further include operations, features, means, or instructions for performing a part-to-part calibration of the UE to obtain a power reduction table based on performing one or more channel measurements.

In some examples of the method, apparatuses, and non-transitory computer-readable medium described herein, performing the one or more channel measurements using the set of resources may include operations, features, means, or instructions for receiving, from the network entity, one or more reference signals using the set of resources, where the one or more reference signals may be periodic, aperiodic, or semi-persistent.

In some examples of the method, apparatuses, and non-transitory computer-readable medium described herein, transmitting the request for resources may include operations, features, means, or instructions for transmitting the request for resources in a medium access control (MAC) control element (MAC-CE), a physical uplink control channel (PUCCH), or any combination thereof.

A method for wireless communication at a network entity is described. The method may include receiving, from a UE, a request for resources for performing channel measurements in accordance with a power reduction update associated with the UE, transmitting, to the UE, an indication of a set of resources in response to the request, and receiving, from the UE, a report that indicates one or more power parameters associated with the power reduction update based on one or more channel measurements at the UE.

An apparatus for wireless communication at a network entity is described. The apparatus may include a processor, memory coupled with the processor, and instructions stored in the memory. The instructions may be executable by the processor to cause the apparatus to receive, from a UE, a request for resources for performing channel measurements in accordance with a power reduction update associated with the UE, transmit, to the UE, an indication of a set of resources in response to the request, and receive, from the UE, a report that indicates one or more power parameters associated with the power reduction update based on one or more channel measurements at the UE.

Another apparatus for wireless communication at a network entity is described. The apparatus may include means for receiving, from a UE, a request for resources for performing channel measurements in accordance with a power reduction update associated with the UE, means for transmitting, to the UE, an indication of a set of resources in response to the request, and means for receiving, from the UE, a report that indicates one or more power parameters associated with the power reduction update based on one or more channel measurements at the UE.

A non-transitory computer-readable medium storing code for wireless communication at a network entity is described. The code may include instructions executable by a processor to receive, from a UE, a request for resources for performing channel measurements in accordance with a power reduction update associated with the UE, transmit, to the UE, an indication of a set of resources in response to the request, and receive, from the UE, a report that indicates one or more power parameters associated with the power reduction update based on one or more channel measurements at the UE.

Some examples of the method, apparatuses, and non-transitory computer-readable medium described herein may further include operations, features, means, or instructions for receiving, from the UE, a request for measurement assistance information for performing the one or more channel measurements and transmitting, to the UE, the measurement assistance information in response to the request for measurement assistance information.

In some examples of the method, apparatuses, and non-transitory computer-readable medium described herein, receiving the request for measurement information may include operations, features, means, or instructions for receiving an indication of an information type of measurement assistance information, where the information type includes an error vector magnitude value, a signal to noise ratio, in-band emission information, out-of-band emission information, adjacent channel interference information, or any combination thereof.

In some examples of the method, apparatuses, and non-transitory computer-readable medium described herein, receiving the request for measurement information may include operations, features, means, or instructions for receiving an indication of the request for measurement assistance information using one or more bits in the request for resources for performing channel measurements in accordance with the power reduction update associated with the UE.

In some examples of the method, apparatuses, and non-transitory computer-readable medium described herein, transmitting the measurement assistance information may include operations, features, means, or instructions for transmitting resource allocation information for the set of resources in the measurement assistance information, where the resource allocation information includes a number of resource blocks, a starting resource block, a power value, a modulation type, or any combination thereof.

In some examples of the method, apparatuses, and non-transitory computer-readable medium described herein, transmitting the measurement assistance information may include operations, features, means, or instructions for transmitting an indication of a pass-fail criteria for one or more measurements of the measurement assistance information.

Some examples of the method, apparatuses, and non-transitory computer-readable medium described herein may further include operations, features, means, or instructions for transmitting, in response to the report, an indication of one or more updated power reduction values for the UE, the one or more updated power reduction values based on the one or more power parameters.

In some examples of the method, apparatuses, and non-transitory computer-readable medium described herein, the one or more updated power reduction values may be based on a geographical location associated with the UE, a time of day, a network load, or any combination thereof.

Some examples of the method, apparatuses, and non-transitory computer-readable medium described herein may further include operations, features, means, or instructions for transmitting, to the UE, one or more reference signals using the set of resources, where the one or more reference signals may be periodic, aperiodic, or semi-persistent.

In some examples of the method, apparatuses, and non-transitory computer-readable medium described herein, receiving the request for resources may include operations, features, means, or instructions for receiving the request for resources in a MAC-CE, a PUCCH, or any combination thereof.

DETAILED DESCRIPTION

Figure 1:
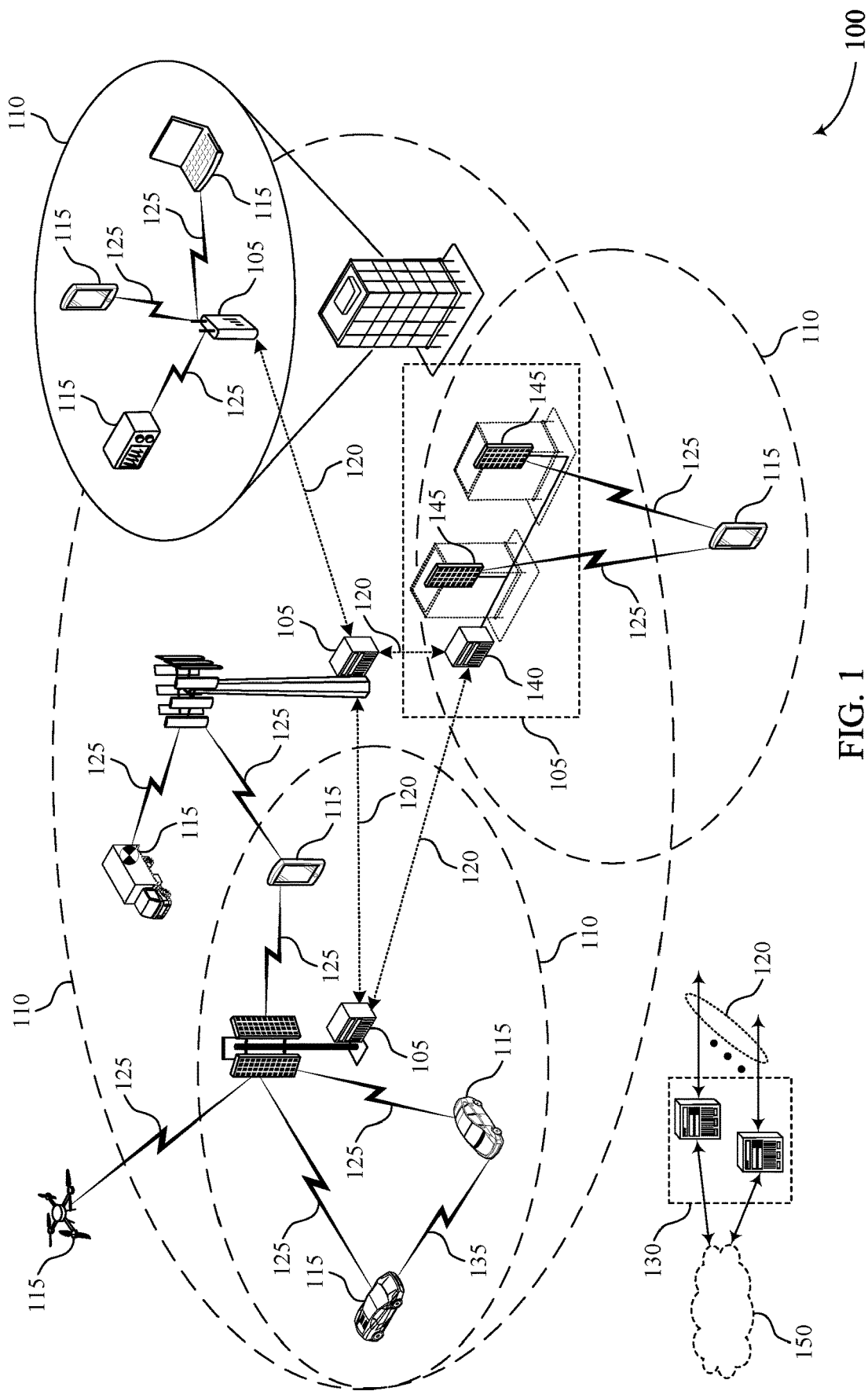
FIGS. 1 and 2 illustrate examples of wireless communications systems that support power reporting for network power modification in accordance with aspects of the present disclosure.

In some cases, the base station and a user equipment (UE) may perform closed loop power control. In such cases, the UE may transmit a power headroom report (PHR) to the base station. The base station may receive the PHR and may determine an uplink transmission power for the UE. PHR may be used to report the headroom between a current UE transmission power and a nominal power which may equal a maximum power, or an adjusted maximum power, that the UE may transmit for a given configuration. In such examples, the base station may use the PHR to estimate how much, or how much more power the UE may use to perform transmissions without infringing on a given power criterion or limitation. In some cases, the UE may transmit PHR to the base station based on a maximum power reduction (MPR) table. The MPR table may be used to define different configurations as well as how much power the UE may reduce from a maximum possible emitted power (e.g., resulting in an adjusted maximum power) for each configuration. In some cases, the MPR table may be defined in a constant manner which may result in one or more deficiencies. For example, characteristics may change at the UE that may affect actual, or real-time, MPR numbers. As such, a static MPR table may result in the UE reporting inaccurate PHR to the base station.

In some examples, the UE may be configured to transmit a measurement resource request to the base station, requesting resources to measure for an MPR update. In such examples, the UE may use the requested resources to measure metrics associated with the MPR table. Additionally, in some cases, the UE may transmit a measurement assistance request to the base station in cases where the UE is interested in the base station measuring metrics associated with the MPR table. In cases where the measurement assistance request is transmitted, the UE may indicate a kind of measurement for the base station to perform. Such measurements may include an error vector magnitude (EVM) measurement, an in-band emission (IBE) measurement, an adjacent channel interference (ACI) measurement for a specific channel, or a combination thereof. In some examples, the base station may transmit assistance information to the UE in response to the measurement resource request including the EVM measurement, the IBE measurement, the ACI measurement, or a combination thereof. In some cases, the base station may transmit a measurement resource indication indicating resources for the UE to perform channel measurements associated with the MPR update. The UE may update the MPR table based on the channel measurements and may transmit a PHR to the base station considering the updated MPR table. In some examples, the UE may transmit a PHR to the base station considering an updated MPR table at the UE. That is, the UE may transmit a PHR to the base station referencing one or more updated MPR numbers as described herein.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to power reporting for network power modification.

FIG. 1 illustrates an example of a wireless communications system 100 that supports power reporting for network power modification in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and N f may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the base station 105 and a UE 115 may perform closed loop power control. In such cases, the UE 115 may transmit a PHR to the base station 105. The base station may receive the PHR and may determine an uplink transmission power for the UE 115. PHR may be used to report the headroom between a current UE 115 transmission power and a nominal power which may equal a maximum power, or an adjusted maximum power, that the UE 115 may transmit for a specific configuration. In such examples, the base station 105 may use the PHR to estimate how much, or how much more power the UE 115 may use to emit transmissions without infringing on specific power criterion. In some cases, the UE 115 may transmit PHR to the base station 105 based on a MPR table. The MPR table may be used to define different configurations as well as how much power the UE 115 may reduce from a maximum possible emitted power (e.g., resulting in an adjusted maximum power) for each configuration. In some cases, the MPR table may be defined in a constant manner which may result in one or more deficiencies. For example, characteristics may change at the UE 115 that may affect actual, or real-time, MPR numbers. As such, a static MPR table may result in the UE 115 reporting inaccurate PHR to the base station 105.

In some examples, the UE 115 may be configured to transmit a measurement resource request to the base station 105, requesting resources to measure for an MPR update. In such examples, the UE 115 may use the requested resources to measure metrics associated with the MPR table. Additionally, in some cases, the UE 115 may transmit a measurement assistance request to the base station 105 in cases where the UE 115 is interested in the base station 105 measuring metrics associated with the MPR table. In cases where the measurement assistance request is transmitted, the UE 115 may indicate a kind of measurement for the base station 105 to perform. Such measurements may include an EVM measurement, an IBE measurement, an ACI measurement for a specific channel, or a combination thereof. In some examples, the base station may transmit assistance information to the UE 115 in response to the measurement resource request including the EVM measurement, the IBE measurement, the ACI measurement, or a combination thereof. In some cases, the base station 105 may transmit a measurement resource indication indicating resources for the UE 115 to perform channel measurements associated with the MPR update. The UE 115 may update the MPR table based on the channel measurements and may transmit a PHR to the base station 105 considering the updated MPR table. In some examples, the UE 115 may transmit a PHR to the base station 105 considering an updated MPR table at the UE 115. That is, the UE 115 may transmit a PHR to the base station 105 referencing one or more updated MPR numbers as described herein.

Figure 2:
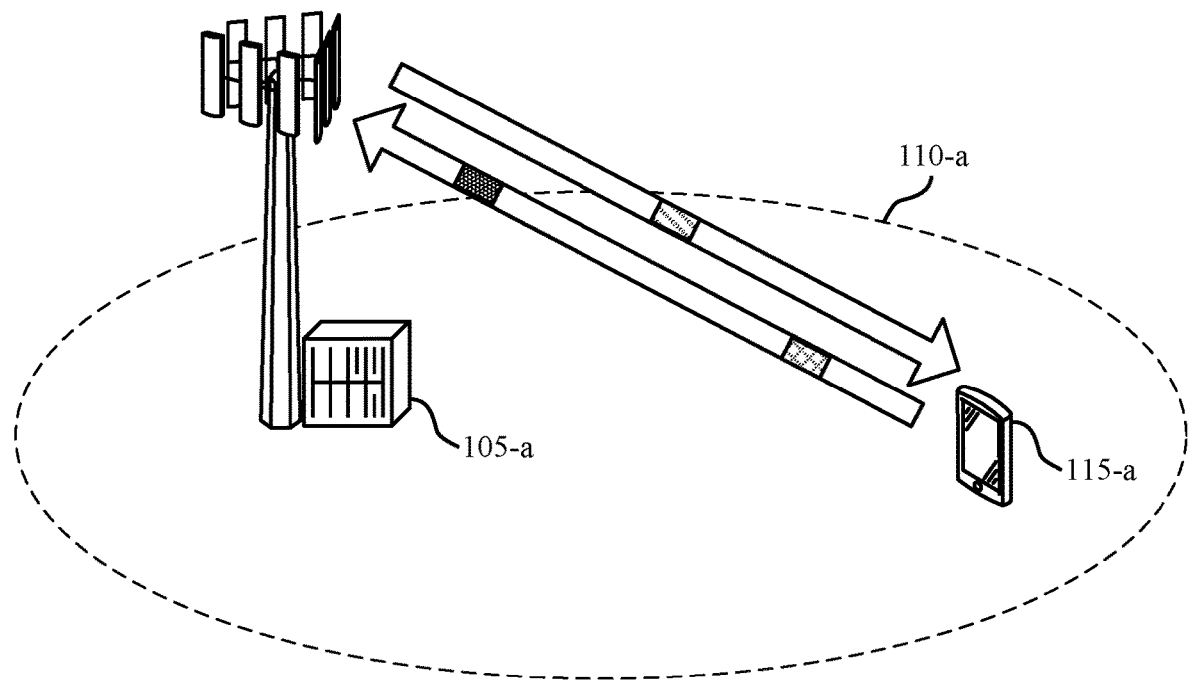
Figure 2:
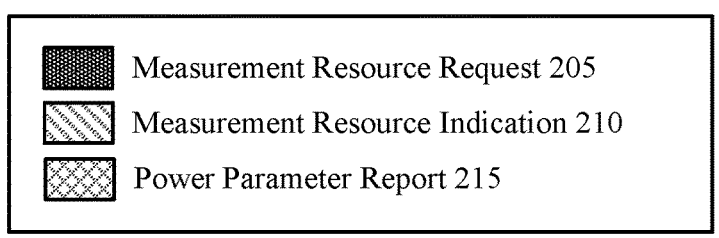

FIG. 2 illustrates an example of a wireless communications system 200 that supports power reporting for network power modification in accordance with aspects of the present disclosure. The wireless communications system 200 may implement or be implemented by aspects of the wireless communications system 100. For example, wireless communications system 200 may include a base station 105-a and a UE 115-a which may be examples of corresponding devices as described with reference to FIG. 1. Base station 105-a may support communications for UE 115-a within geographic coverage area 110-a. In some examples, the UE 115-a and the base station 105-a may exchange an signaling supporting an update for one or more MPR values at the UE 115-a.

In some wireless communications systems, utilization efficiency of influential resources, such as radiated power, may have a significant impact on wireless system design. For example, communications between the UE 115-a and the base station 105-a considering utilization efficiency of transmission power may save energy at the UE 115-a and the base station 105-a, mitigate signal distortion (e.g., due to non-linear performance of transmitting components), among other examples. In some cases, as transmitters may contain non-linear components, such as high-power amplifiers (PAs) with limited linear dynamic range (DR), such transmitters may distort signals due to high peak to average power ratio (PAPR) (e.g., as opposed to transmitting signals with relatively lower power). Non-linear distortions may be classified by in-band distortion (IBD), which may affect link performance in terms of mutual information (e.g., information communicated between the UE 115-a and the base station 105-a), EVM, or both, and classified by out-band distortion (OBD), which may dictate an amount of ACI or IBE. In some cases, ACI may indicate how much an adjacent channel may be "polluted" or interfered by a main transmission, while IBE may indicate how much a main communication channel may be polluted by the main transmission. For example, the UE 115-a and the base station 105-a may experience ACI in cases where power from a transmission in an adjacent channel interferes with a communication between the UE 115-a and the base station 105-a. In another example, the UE 115-a and the base station 105-a may experience IBE in cases where power from a first communication in a main channel between the UE 115-a and the base station 105-a interferes with a second communication in the main channel. To avoid such distortions, power backoff (BO) may be introduced, where the UE 115-a and the base station 105-a may be configured to reduce transmission power in response to detecting channel distortions. However, implementing power BO may introduce a deficiency. For example, the less PA power efficiency (e.g., due to power reduction), the less power is transmitted to the channel, in some cases, resulting in failure to decode communications, lower throughput, and system latency.

In some wireless communications systems, such as wireless communications systems configured to communicate in accordance with 5G NR, an amount of distortions (e.g., both IBD and OBD) may be known to only UEs 115. For example, such IBD and OBD may be measured by the UE 115-a offline as part of a product characterization (e.g., the UE 115-a may be configured to measure such distortions) or in a factory calibration for advanced UEs 115. In wireless communications system 200, the UE 115-a may be an advanced UE 115-a or a non-advanced UE 115-a. In some examples, a power control mechanism responsible for setting uplink transmission power may be performed by the base station 105-a, where the base station 105-a may control BO for UE 115-a transmissions. However, in such examples, the base station 105-a may be unaware of how much power the UE 115-a may emit transmissions without impinging on one or more criteria (e.g., random access network (RAN) 4 criteria, RAN 5 criteria) such as EVM, IBE, ACI, among other criteria.

In some examples, the base station 105-a may use closed loop control, where the base station 105-a may obtain information regarding power change limits from PHRs signaled by the UE 115-a. That is, the UE 115-a may transmit a PHR to the base station 105-a indicating how much power may be left for the UE 115-a to use in addition to power being used for a related transmission. In some cases, the UE 115-a may be aware of an IBD, an OBD, or a combination thereof, for an extended period of time and for each power level, bandwidth, configuration. In such cases, reporting PHR to the base station 105-a may be sufficient for uplink transmission power control. However, for various reasons, reporting PHR to the base station 105-a alone may not be sufficient for uplink power control, reducing an efficiency of the power control mechanism.

In some cases, the base station 105-a may perform closed loop power control based on different inputs, such as target SNR, measured SNR, among other inputs (e.g., configured by a vendor-specific implementation of the base station 105-a). In such cases, the UE 115-a may transmit, via a MAC control element (MAC-CE), at least a PHR. The base station may receive the PHR and, in some cases, the different inputs, and may determine an uplink transmission power for the UE 115-a. For example, the base station 105-a may receive the PHR and may measure an SNR for the channel between the UE 115-*a* and the base station 105-*a* and may determine the uplink transmission power. PHR may be used to report the headroom between a current UE 115-*a* transmission power and a nominal power which may equal a maximum power that the UE 115-*a* may transmit for a specific configuration. In such examples, the base station 105-*a* may use the PHR to estimate how much, or how much more power the UE 115-*a* may use to emit transmissions without infringing on specific power criterion (e.g., configured at the UE 115-*a*).

In some examples, PHR may be triggered in two ways. In some cases, the UE 115-*a* may calculate a path loss change greater than a pathloss threshold, triggering the UE 115-*a* to transmit the PHR to the base station 105-*a*. For example, the UE 115-*a* may measure a first path loss at a first time and a second path loss at a second time, where in cases that the difference between the first path loss and the second path loss satisfies the path loss threshold, the UE 115-*a* may transmit the PHR to the base station 105-*a*. In some cases, the UE 115-*a* may transmit PHR to the base station 105-*a* according to a periodic timer. In other words, the UE 115-*a* may transmit PHR to the base station 105-*a* periodically. In some examples, the UE 115-*a* may transmit the PHR in accordance with one or more configurations. For example, the UE 115-*a* may be configured to transmit the PHR considering transmission parameters such as a modulation and coding scheme (MCS), carrier aggregation, a waveform type, among other parameters. In some examples, the UE 115-*a* may transmit PHR in accordance with one or more constraints which may be subject to IBD, OBD, or a combination thereof, or other constraints configured at the UE 115-*a* for the UE 115-*a* to fulfill.

In some cases, the UE 115-*a* may transmit PHR to the base station 105-*a* based on an MPR table. The MPR table may be used to define different configurations as well as how much power the UE 115-*a* may reduce from a maximum possible emitted power (e.g., 15 dBm per MPR element in frequency range (FR) 2) for each configuration. As an illustrative example, Table 1 may represent an MPR table.

using a DFT waveform, and 64 quadrature amplitude modulation (QAM) scheme. As such, the UE 115-*a* may transmit signaling to the base station 105-*a* using a maximum transmit power minus 4 dBm. In some cases, to report power headroom, the UE 115-*a* may calculate how much transmission power the UE 115-*a* has left to use on top of the power in a transmission, compared to the number in the MPR table for a specific configuration (e.g., scenario). That is, the UE 115-*a* may report the power headroom as the difference between a power for a current transmission and the maximum transmit power minus the number in the MPR table for a specific configuration.

In some examples, the MPR numbers in the MPR table may be configured in a constant manner, where the actual MPR number may vary over several dimensions, resulting in under reporting of PHR. For example, MPR number may vary due to part-to-part effects (e.g., up to at least 2 dB of MPR number fluctuation), temperature effects (e.g., up to 3 dB or 1 dB per 20 degrees Fahrenheit of MPR number fluctuation), aging effects (e.g., up to 1 dB of MPR number fluctuation after one or more years), or a combination thereof. In some cases, to address such MPR number fluctuation, there may be two options. In a first example, wireless communications systems may define a constant MPR table for multiple UEs 115, considering the performance of a worst UE 115. That is, the constant MPR table may be defined in accordance with MPR number fluctuations at UEs 115 with relatively poor device sustainability (e.g., in terms of part-to-part effects, temperature effects, aging effects, or a combination thereof). In a second example, wireless communications systems may enable devices to measure the MPR tale per part as part of a factory calibration or timing operation. In such examples, MPR numbers may increase due to temperature and aging. That is, it may be difficult to perform factory training for different operating temperatures (e.g., a fundamental constraint). Additionally, using char may be a relatively unsafe option due to part-to-part variation. Further, aging may be difficult to predict and MPR numbers may increase by approximately

TABLE 1

| | | BW<=100-Mhz Allocation | | BW<=200-Mhz Allocation | | BW<=400-Mhz Allocation | | CA Allocation | |
|---|---|---|---|---|---|---|---|---|---|
| | | | | | | Modulation | | | |
| Waveform | | In | Out | In | Out | In | Out | <=400 Mhz | <=800 Mhz | <=1400 Mhz |
| DFT | PI/2 BPSK | 0 | 2 | 0 | 2.5 | 0 | 4 | 4 | 4.5 | 5 |
| | QPSK | 0 | 2 | 0 | 2.5 | 0 | 4 | 4 | 4.5 | 5 |
| | 16QAM | 0 | 3.5 | 2 | 4 | 3 | 4.5 | 6 | 6.5 | 6.5 |
| | 64QAM | 4 | 5.5 | 4 | 6 | 4.5 | 6.5 | 8 | 8.5 | 8.5 |
| CP OFDM | QPSK | 3 | 4 | 3 | 4.5 | 4 | 5 | 6 | 6.5 | 6.5 |
| | 16QAM | 4 | 5 | 4 | 5.5 | 5 | 6.5 | 7 | 7.5 | 7.5 |
| | 64QAM | 6 | 8 | 6 | 8.5 | 6.5 | 9 | 9 | 10.5 | 11.2 |

Each entry the MPR table may represent a specific scenario, which may be limited by one or more possible constraints such as EVM, ACI, IBE, or a combination thereof. Further, each number in the MPR table may constrain a power that the UE 115-*a* may transmit signaling with. Specifically, for a specific scenario, the UE 115-*a* may transmit up to a maximum transmit power minus the MPR number corresponding to the scenario. For example, the UE 115-*a* may communicate with the base station 105-*a* using a bandwidth that may be less than or equal to 200 MHz, transmitting signaling on the inner part of the bandwidth, 1 dB observed over one or more years (e.g., where aging may depend on a frequency that a PA may be used).

In wireless communications system 200, the UE 115-*a* may be configured to transmit a measurement resource request 205 to the base station 105-*a*, requesting resources to measure for an MPR update. In some examples, the UE 115-*a* may use the requested resources to measure metrics associated with the MPR table. The UE 115-*a* may transmit the measurement resource request 205 in a MAC-CE, a physical uplink control channel (PUCCH) message, or both. In some examples, the UE 115-*a* may transmit a measurement assistance request to the base station 105-a in cases where the UE 115-a is interested in the base station 105-a measuring metrics associated with the MPR table. In some examples, the UE 115-a may transmit the measurement assistance request to the base station 105-a using a bit in the measurement resource request 205. In cases where the measurement assistance request is transmitted, the UE 115-a may indicate a kind of measurement for the base station 105-a to perform. Such measurements may include an EVM measurement (e.g., SNR: an explicit number or a bit that indicates if a measured SNR satisfies an SNR threshold), an IBE measurement, an ACI for a specific channel, or a combination thereof. In some examples, the base station 105-a may transmit assistance information to the UE 115-a in response to the measurement resource request 205 including the EVM measurement, the IBE measurement, the ACI measurement, or a combination thereof. Additionally or alternatively, the base station 105-a may transmit assistance information to the UE 115-a including allocation details (e.g., a number of resource blocks, a starting resource block, a power, a modulation type) for the UE 115-a to use for subsequent transmission. In some cases, the UE 115-a may refrain from requesting measurement assistance information from the base station 105-a. For example, the UE 115-a may be an advanced UE 115-a and may be able to perform the channel measurements without assistance information from the base station 105-a. In some examples, the UE 115-a may transmit, to the base station 105-a, a power parameter report 215 considering an updated MPR table at the UE 115-a. That is, the UE 115-a may transmit a PHR to the base station 105-a referencing one or more updated MPR numbers as described herein.

In some examples, measuring channel metrics for an MPR update may be extended to a sidelink mode 2, supporting autonomous UE 115-a operation. For example, the UE 115-a may be a sidelink device and may be configured to sense and select resources for communications based on a network configuration. In such examples, the UE 115-a may sense the network and may allocate resources for self measurement as opposed to transmitting the measurement resource request 205 for the base station 105-a to allocate such resources.

In some examples, the base station 105-a may allocate resources to the UE 115-a that will assist the UE 115-a in measuring the MPR numbers. The base station 105-a may transmit one or more reference signals on the allocated resources, where the UE 115-a may receive the one or more reference signals and may perform the channel measurements on the reference signals. In some examples, the base station 105-a may transmit the reference signals periodically, aperiodically, or semi-persistently.

In some examples, the base station 105-a may transmit pass or fail criteria to the UE 115-a. Further, the base station 105-a may have an option of indicating a gap in the MPR table. The pass or fail criteria may be based on specific criteria that the UE 115-a requested the base station 105-a to measure. For example, the UE 115-a may transmit a request for measurement assistance information including a request for the base station 105-a to measure an EVM, an IBE, an ACI, or a combination thereof. In such examples, the base station 105-a may transmit the assistance information to the UE 115-a in some cases including pass or fail criteria for the EVM, the IBE, the ACI, or a combination thereof for the UE 115-a to use to determine whether to perform the MPR update. In some examples, the base station 105-a may modify one or more configured constraints and may signal such modified constraints to the UE 115-a. That is, the UE 115-a may be configured to adopt MPR tables in accordance with one or more configured constraints, where allowing the base station 105-a to modify the constraints may enable the UE 115-a to use the modified constraints, resulting in more flexible operation of the UE 115-a. For example, such configured constraints may fail to differentiate between geo-locations, a time of day, or other parameters that may affect a load on the network. Enabling the base station 105-a to modify UE 115-a constraints based on the network load may result in more flexible operation of the UE 115-a (e.g., in terms of MPR table flexibility). In another example, UE 115-a constraints may treat IBE and OBD in a similar (or same) manner, which may be improved by making the treatment of IBE and OBD separate, dynamic, and controllable by the base station 105-a. Enabling the base station 105-a to modify constraints at the UE 115-a may allow for significant enhancement on PA power efficiency by adopting MPR tables based on real time field constraints (e.g., modified constraints by the base station 105-a), or deployment constraints, which may be based on channel measurements.

In some examples, the base station 105-a may update a UE 115-a configuration, for example, one or more UE 115-a constraints, without an explicit request from the UE 115-a. For example, the base station 105-a may update the UE 115-a configuration in cases where the base station determines to reconsider MPR parameters, PHR parameters, or both, for example, due to a reduced load on the network (e.g., allowing for less restrictive constraints), a combination with beam management for improved power efficiency on the network level, a negotiation with other base station 105 regarding coverage areas 110 in which modified constraints may differ.

In some examples, the UE 115-a may perform a factory part-to-part calibration of the MPR table, for example, to reduce one or more gaps in the MPR table.

Configuring devices to perform the techniques as described herein for updating an MPR table at the UE 115-a may provide for more accurate power estimation at the UE 115-a, resulting in enhanced power efficiency, greater throughput communications, and reduced system latency.

Figure 3:
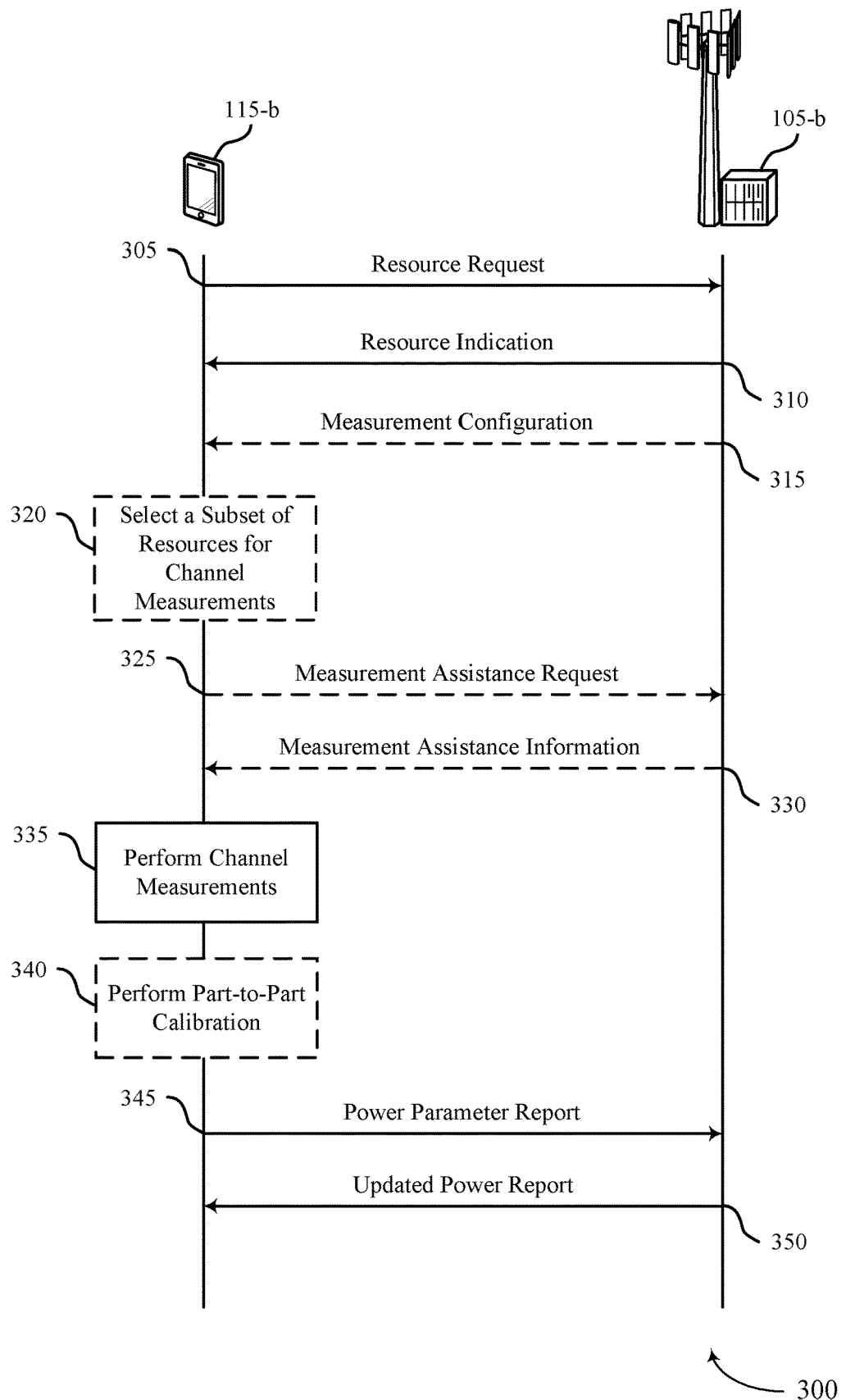
FIG. 3 illustrates an example of a process flow that supports power reporting for network power modification in accordance with aspects of the present disclosure.

FIG. 3 illustrates an example of a process flow 300 that supports power reporting for network power modification in accordance with aspects of the present disclosure. In some examples, the process flow 300 may implement aspects of wireless communications systems 100 or 200. For example, process flow 300 may include UE 115-b and base station 105-b, which may be examples of corresponding devices as described with reference to FIGS. 1 and 2. In some examples, the UE 115-b and the base station 105-b may exchange signaling with one another, supporting an MPR update at the UE 115-b.

In the following description of the process flow 300, the operations may be performed (e.g., reported or provided) in a different order than the order shown, or the operations performed by the UE 115-b and the base station 105-b may be performed in different orders or at different times. For example, specific operations also may be left out of the process flow 300, or other operations may be added to the process flow 300. Further, although some operations or signaling may be shown to occur at different times for discussion purposes, these operations may actually occur at the same time.

At 305, the UE 115-b may transmit, and the base station 105-b may receive, a request for resources for performing channel measurements in accordance with a power reduction update associated with the UE 115-b. For example, the UE 115-b may transmit a measurement resource request 205 to the base station 105-b as described with reference to FIG. 2. In some examples, the UE 115-b may transmit the request for resources in a MAC-CE, a PUCCH message, or any combination thereof.

At 310, the base station 105-b may transmit, and the UE 115-b may receive a resource indication indicating a set of resources in response to the request at 305. For example, the base station may transmit a measurement resource indication 210 to the UE 115-b as described with reference to FIG. 2.

In some examples, at 315, the base station 105-b may transmit, and the UE 115-b may receive a message indicating a configuration for performing channel measurements in accordance with the power reduction associated with the UE 115-a. For example, the base station 105-b may transmit the message indicating one or more updated configured constraints, one or more pass or fail criteria associated with channel measurements, or both for the UE 115-b to perform the MPR updated based thereon.

In such examples, at 320, the UE 115-b may select, based at least in part on the configuration, a subset of the set of resources for performing the one or more channel measurements. For example, the UE 115-a may receive the configuration and may determine to transmit signaling to the base station 105-a using an inner band of the resources indicated by the base station 105-a.

In some examples, at 325, the UE 115-b may transmit, to the base station 105-b, a request for measurement assistance information for performing the one or more channel measurements. In some cases, the UE 115-b may transmit the request for measurement assistance information including an indication of an information type of measurement assistance information, where the information type may include an EVM value, an SNR, IBE information, OBE information, ACI information, or any combination thereof. In some cases, the UE 115-b may transmit an indication of the request for measurement assistance information using one or more bits in the request for resources for performing channel measurements in accordance with the power reduction update associated with the UE 115-b.

In such examples, at 330, the UE 115-b may receive, from the base station 105-b, the measurement assistance information in response to the request for measurement assistance information. In some cases, receiving the measurement assistance information may include receiving resource allocation information for the set of resources in the measurement assistance information, where the resource allocation information may include a number of resource blocks, a starting resource block, a power value, a modulation type, or any combination thereof. Additionally or alternatively, receiving the measurement assistance in formation may include receiving an indication of a pass-fail criteria for one or more measurements of the measurement assistance information.

At 335, the UE 115-b may perform one or more channel measurements using the set of resources based on receiving the indication of the set of resources at 310. In some examples, to support such channel measurements the base station 105-b may transmit, and the UE 115-b may receive one or more reference signals using the set of resources, where the one or more reference signals may be periodic, aperiodic, or semi-persistent.

In some examples, at 340, the UE 115-b may perform a part-to-part calibration to obtain a power reduction table based at least in part on performing one or more channel measurements.

At 345, the UE 115-b may transmit a power parameter report to the base station 105. That is, the UE 115-b may transmit, to the base station 105-b, a report that indicates one or more power parameters associated with the power reduction updated based on the one or more channel measurements.

At 350, the base station 105-b may transmit, and the UE 115-b may receive, in response to the report at 435, an indication of one or more updated power reduction values for the UE 115-b, the one or more updated power reduction values based at least in part on the one or more power parameters. In some examples, the one or more updated power reduction values may be based on a geographical location associated with the UE 115-b, a time of day, a network load, or any combination thereof.

Figure 4:
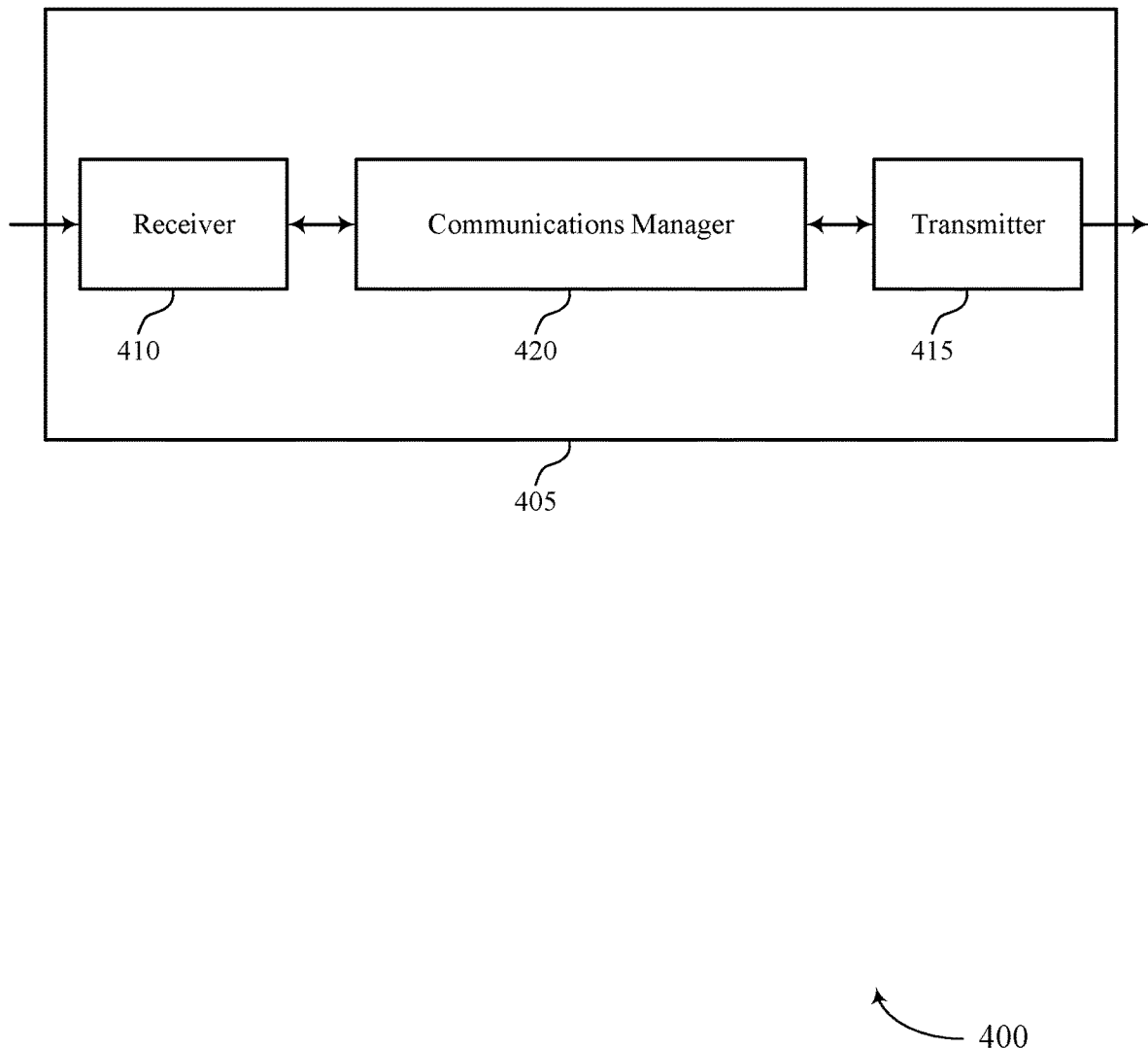
FIGS. 4 and 5 show block diagrams of devices that support power reporting for network power modification in accordance with aspects of the present disclosure.

FIG. 4 shows a block diagram 400 of a device 405 that supports power reporting for network power modification in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to power reporting for network power modification). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to power reporting for network power modification). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of power reporting for network power modification as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for transmitting, to a network entity, a request for resources for performing channel measurements in accordance with a power reduction update associated with the UE. The communications manager 420 may be configured as or otherwise support a means for receiving, from the network entity, an indication of a set of resources in response to the request. The communications manager 420 may be configured as or otherwise support a means for transmitting one or more signals using the set of resources based on receiving the indication of the set of resources. The communications manager 420 may be configured as or otherwise support a means for performing one or more channel measurements using the set of resources based on receiving the indication of the set of resources. The communications manager 420 may be configured as or otherwise support a means for transmitting, to the network entity, a report that indicates one or more power parameters associated with the power reduction update based on the one or more channel measurements.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for an MPR update at a UE, resulting in reduced processing, reduced power consumption, and more efficient utilization of communication resources.

Figure 5:
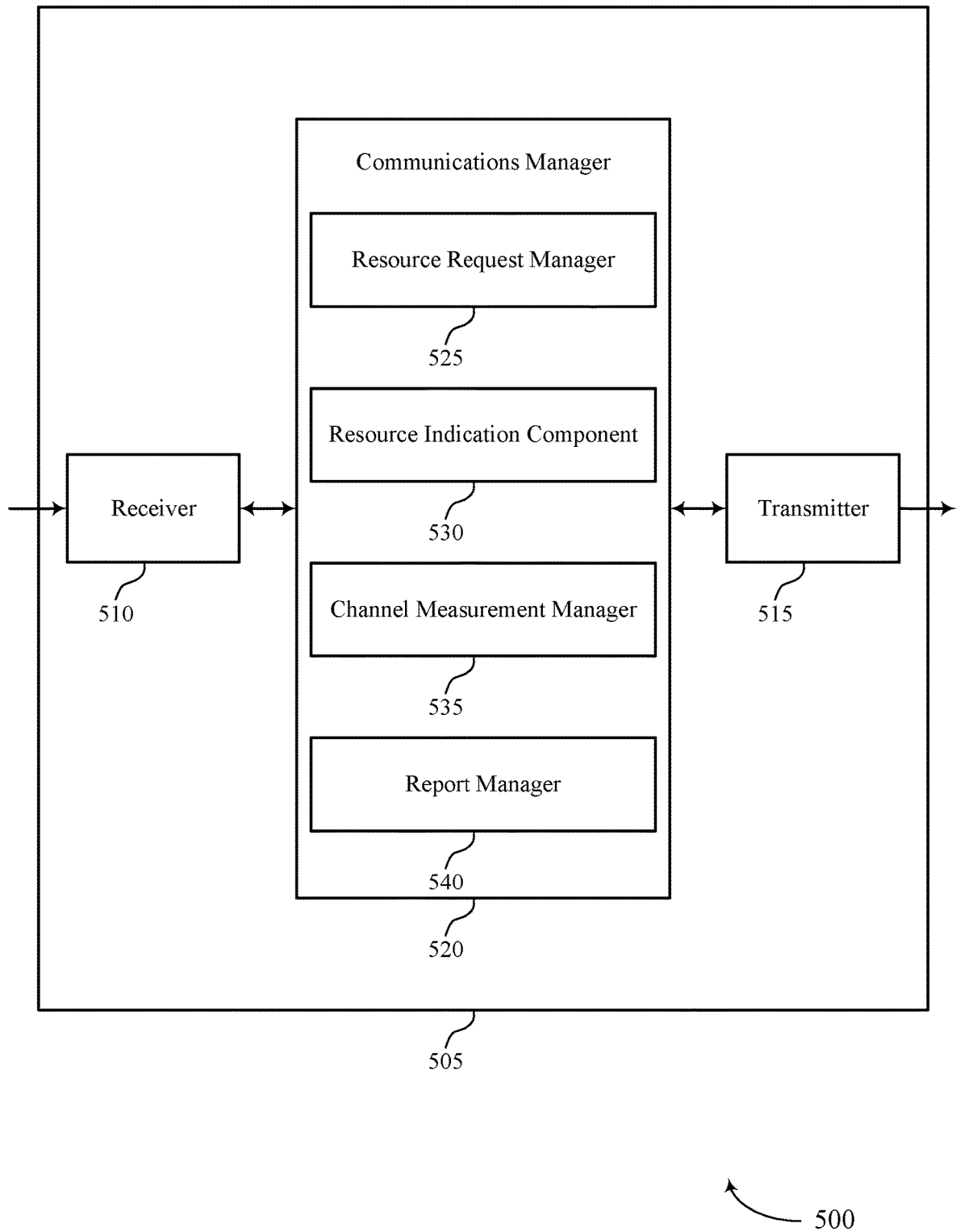

FIG. 5 shows a block diagram 500 of a device 505 that supports power reporting for network power modification in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to power reporting for network power modification). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power reporting for network power modification). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of power reporting for network power modification as described herein. For example, the communications manager 520 may include a resource request manager 525, a resource indication component 530, a channel measurement manager 535, a report manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The resource request manager 525 may be configured as or otherwise support a means for transmitting, to a network entity, a request for resources for performing channel measurements in accordance with a power reduction update associated with the UE. The resource indication component 530 may be configured as or otherwise support a means for receiving, from the network entity, an indication of a set of resources in response to the request. The resource indication component 530 may be configured as or otherwise support a means for transmitting one or more signals using the set of resources based on receiving the indication of the set of resources. The channel measurement manager 535 may be configured as or otherwise support a means for performing one or more channel measurements using the set of resources based on receiving the indication of the set of resources. The report manager 540 may be configured as or otherwise support a means for transmitting, to the network entity, a report that indicates one or more power parameters associated with the power reduction update based on the one or more channel measurements.

Figure 6:
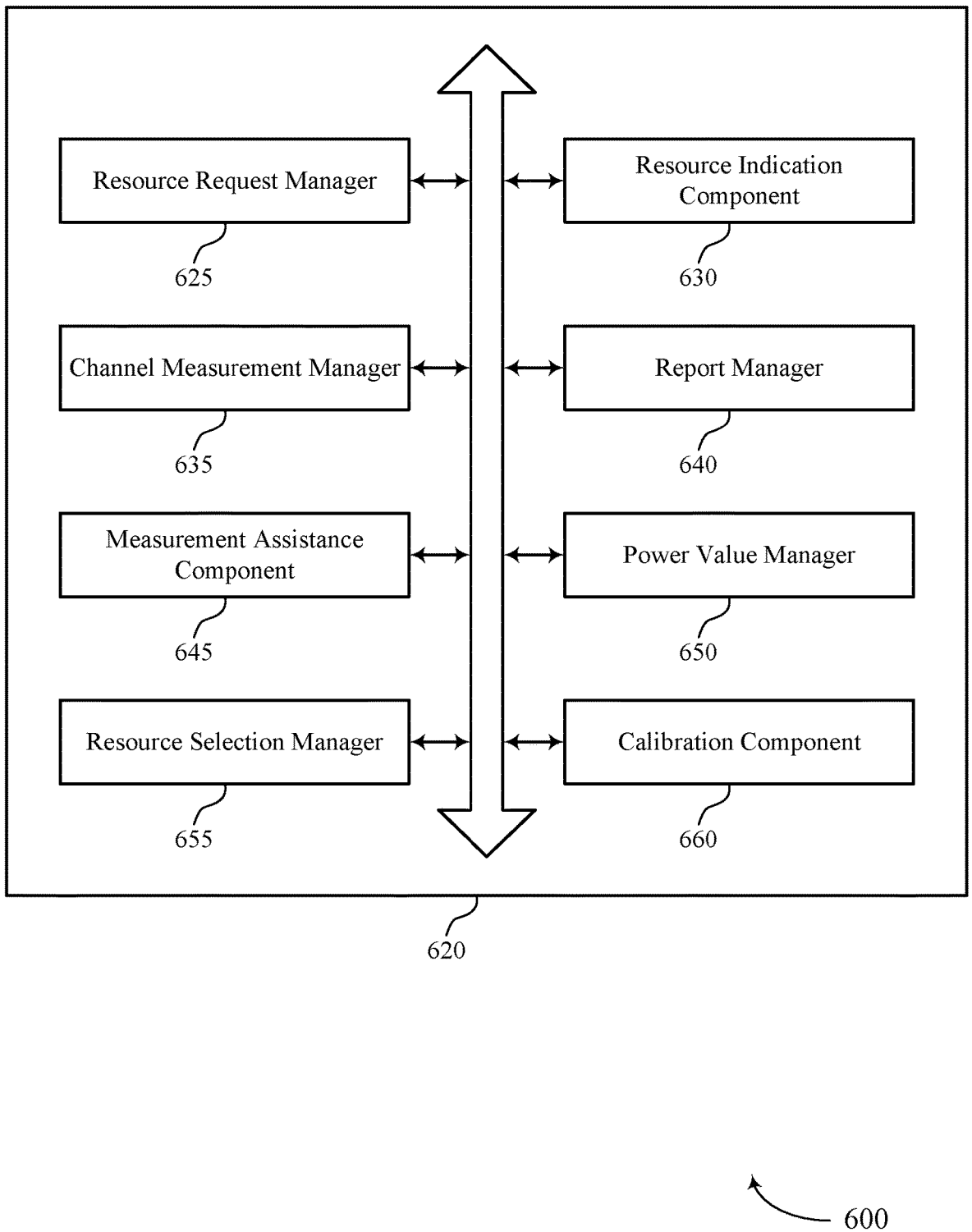
FIG. 6 shows a block diagram of a communications manager that supports power reporting for network power modification in accordance with aspects of the present disclosure.

FIG. 6 shows a block diagram 600 of a communications manager 620 that supports power reporting for network power modification in accordance with aspects of the present disclosure. The communications manager 620 may be an example of aspects of a communications manager 420, a communications manager 520, or both, as described herein. The communications manager 620, or various components thereof, may be an example of means for performing various aspects of power reporting for network power modification as described herein. For example, the communications manager 620 may include a resource request manager 625, a resource indication component 630, a channel measurement manager 635, a report manager 640, a calibration component 645, a measurement assistance component 650, a power value manager 655, a resource selection manager 660, or any combination thereof. Each of these components may communicate, directly or indirectly, with one another (e.g., via one or more buses).

The communications manager 620 may support wireless communication at a UE in accordance with examples as disclosed herein. The resource request manager 625 may be configured as or otherwise support a means for transmitting, to a network entity, a request for resources for performing channel measurements in accordance with a power reduction update associated with the UE. The resource indication component 630 may be configured as or otherwise support a means for receiving, from the network entity, an indication of a set of resources in response to the request. In some examples, the resource indication component 630 may be configured as or otherwise support a means for transmitting one or more signals using the set of resources based on receiving the indication of the set of resources. The channel measurement manager 635 may be configured as or otherwise support a means for performing one or more channel measurements using the set of resources based on receiving the indication of the set of resources. The report manager 640 may be configured as or otherwise support a means for transmitting, to the network entity, a report that indicates one or more power parameters associated with the power reduction update based on the one or more channel measurements.

In some examples, the calibration component 645 may be configured as or otherwise support a means for performing a part-to-part calibration of the UE to obtain a power reduction table based on performing one or more channel measurements.

In some examples, the measurement assistance component 650 may be configured as or otherwise support a means for transmitting, to the network entity, a request for measurement assistance information for performing the one or more channel measurements. In some examples, the measurement assistance component 650 may be configured as or otherwise support a means for receiving, from the network entity, the measurement assistance information in response to the request for measurement assistance information.

In some examples, to support transmitting the request for measurement assistance information, the measurement assistance component 650 may be configured as or otherwise support a means for transmitting an indication of an information type of measurement assistance information, where the information type includes an EVM value, a SNR, IBE information, OBE information, ACI information, or any combination thereof.

In some examples, to support transmitting the request for measurement assistance information, the measurement assistance component 650 may be configured as or otherwise support a means for transmitting an indication of the request for measurement assistance information using one or more bits in the request for resources for performing channel measurements in accordance with the power reduction update associated with the UE.

In some examples, to support receiving the indication of the set of resources, the measurement assistance component 650 may be configured as or otherwise support a means for receiving a number of resource blocks, a starting resource block, a power value, a modulation type, or any combination thereof based on the request for measurement assistance information.

In some examples, to support receiving the measurement assistance information, the measurement assistance component 650 may be configured as or otherwise support a means for receiving an indication of a path fail criteria for one or more measurements of the measurement assistance information, where the one or more measurements correspond to an EVM value, a SNR, IBE information, OBE information, ACI information, or any combination thereof.

In some examples, the power value manager 655 may be configured as or otherwise support a means for receiving, in response to the report, an indication of one or more updated criteria for the UE, the one or more updated criteria based on the one or more power parameters.

In some examples, the one or more updated criteria correspond to an correspond to an IBE criteria, an out-of-band criteria, an ACI criteria, or a combination thereof.

In some examples, the one or more updated criteria are based on a geographical location associated with the UE, a time of day, a network load, or any combination thereof.

In some examples, the channel measurement manager 635 may be configured as or otherwise support a means for receiving, from the network entity, a message indicating a configuration for performing channel measurements in accordance with the power reduction update associated with the UE. In some examples, the resource selection manager 660 may be configured as or otherwise support a means for selecting, based on the configuration, a subset of the set of resources for performing the one or more channel measurements.

In some examples, the channel measurement manager 635 may be configured as or otherwise support a means for receiving, from the network entity, a signal indicating for the UE to use one or more default power parameters.

In some examples, to support transmitting the request for resources, the resource request manager 625 may be configured as or otherwise support a means for transmitting the request for resources in a MAC-CE, a PUCCH, or any combination thereof.

Figure 7:
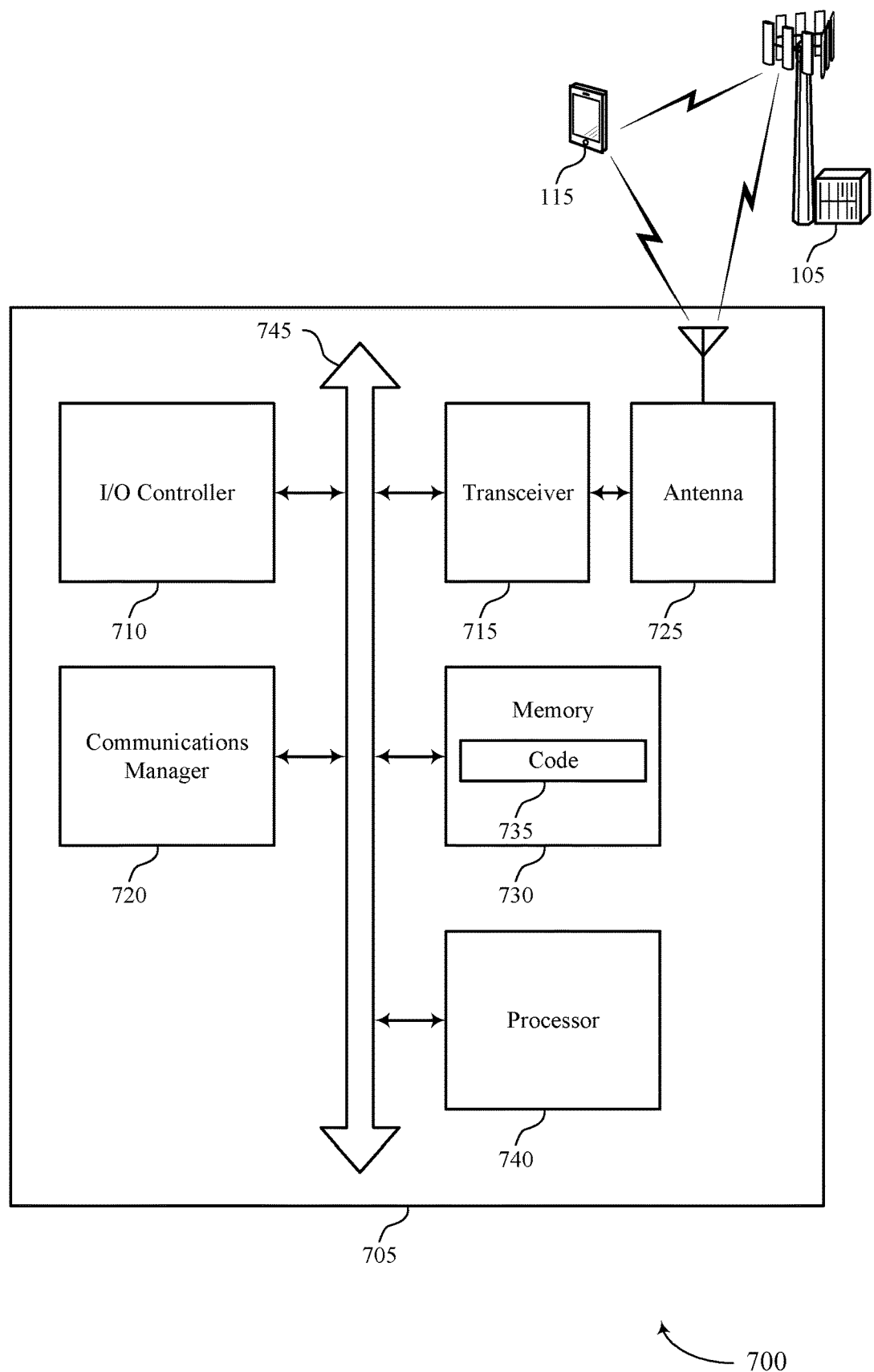
FIG. 7 shows a diagram of a system including a device that supports power reporting for network power modification in accordance with aspects of the present disclosure.

FIG. 7 shows a diagram of a system 700 including a device 705 that supports power reporting for network power modification in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting power reporting for network power modification). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for transmitting, to a network entity, a request for resources for performing channel measurements in accordance with a power reduction update associated with the UE. The communications manager 720 may be configured as or otherwise support a means for receiving, from the network entity, an indication of a set of resources in response to the request. The communications manager 720 may be configured as or otherwise support a means for transmitting one or more signals using the set of resources based on receiving the indication of the set of resources. The communications manager 720 may be configured as or otherwise support a means for performing one or more channel measurements using the set of resources based on receiving the indication of the set of resources. The communications manager 720 may be configured as or otherwise support a means for transmitting, to the network entity, a report that indicates one or more power parameters associated with the power reduction update based on the one or more channel measurements.

By including or configuring the communications manager 720 in accordance with examples as described herein, the device 705 may support techniques for an MPR update at a UE, resulting in improved communication reliability, reduced latency, more efficient utilization of communication resources, improved coordination between devices, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of power reporting for network power modification as described herein, or the processor 740 and the memory 730 may be otherwise configured to perform or support such operations.

Figure 8:
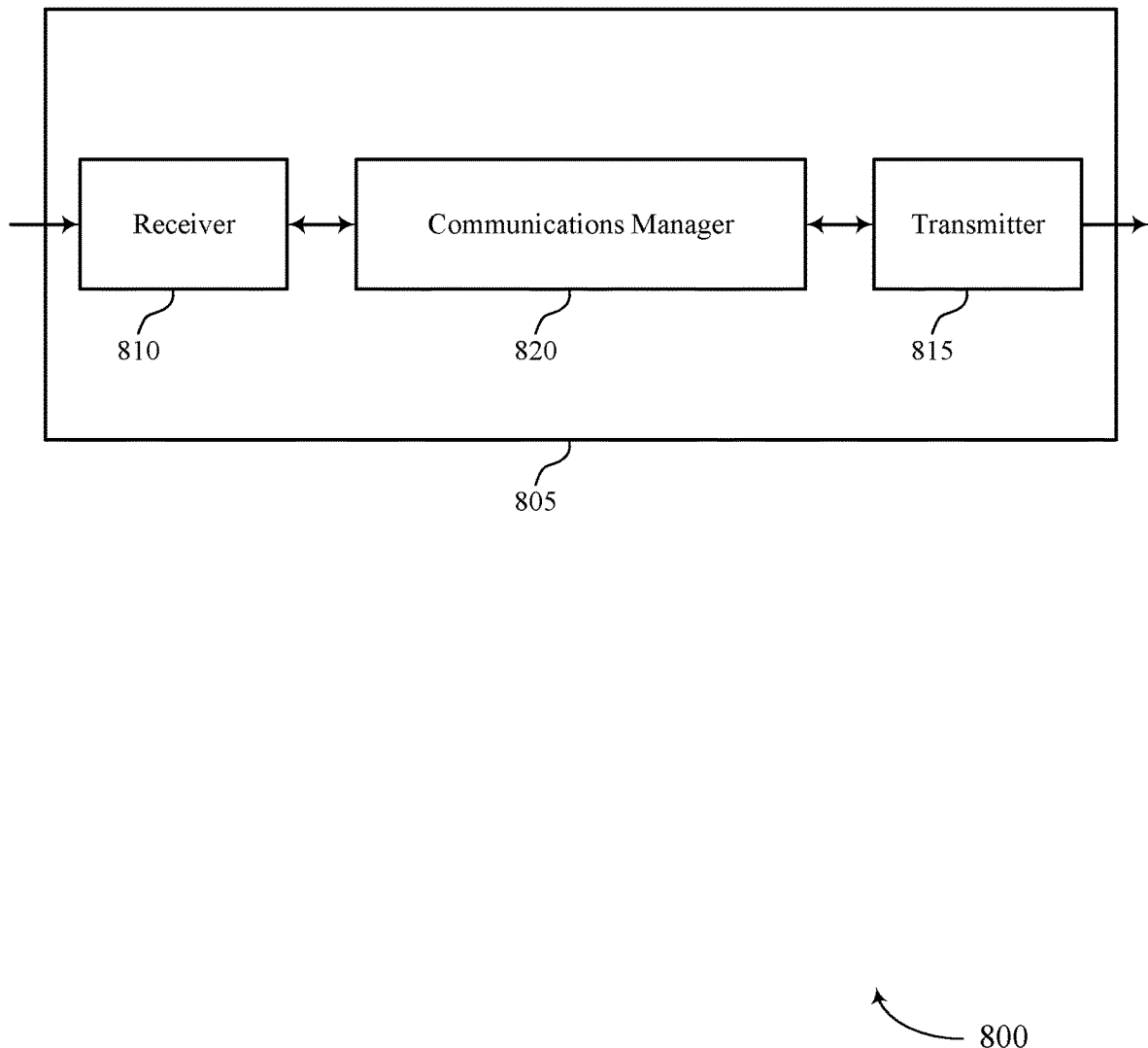
FIGS. 8 and 9 show block diagrams of devices that support power reporting for network power modification in accordance with aspects of the present disclosure.

FIG. 8 shows a block diagram 800 of a device 805 that supports power reporting for network power modification in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to power reporting for network power modification). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to power reporting for network power modification). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of power reporting for network power modification as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a network entity in accordance with examples as disclosed herein. For example, the communications manager 820 may be configured as or otherwise support a means for receiving, from a UE, a request for resources for performing channel measurements in accordance with a power reduction update associated with the UE. The communications manager 820 may be configured as or otherwise support a means for allocating, to the UE, an indication of a set of resources in response to the request. The communications manager 820 may be configured as or otherwise support a means for receiving, from the UE, a report that indicates one or more power parameters associated with the power reduction update based on one or more channel measurements at the UE.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for an MPR update at a UE, resulting in reduced processing and more efficient utilization of communication resources.

Figure 9:
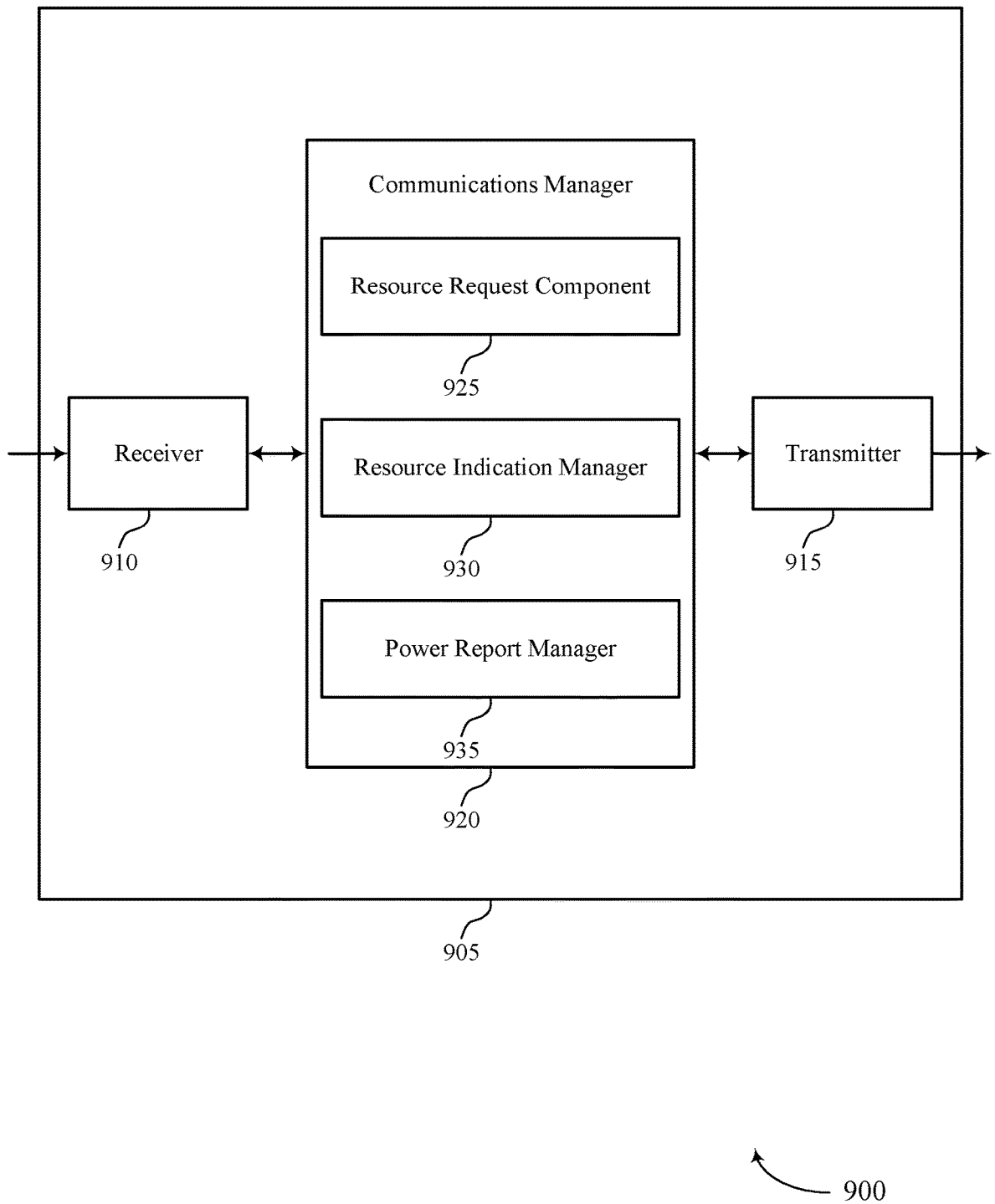

FIG. 9 shows a block diagram 900 of a device 905 that supports power reporting for network power modification in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to power reporting for network power modification). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to power reporting for network power modification). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of power reporting for network power modification as described herein. For example, the communications manager 920 may include a resource request component 925, a resource indication manager 930, a power report manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a network entity in accordance with examples as disclosed herein. The resource request component 925 may be configured as or otherwise support a means for receiving, from a UE, a request for resources for performing channel measurements in accordance with a power reduction update associated with the UE. The resource indication manager 930 may be configured as or otherwise support a means for allocating, to the UE, an indication of a set of resources in response to the request. The power report manager 935 may be configured as or otherwise support a means for receiving, from the UE, a report that indicates one or more power parameters associated with the power reduction update based on one or more channel measurements at the UE.

Figure 10:
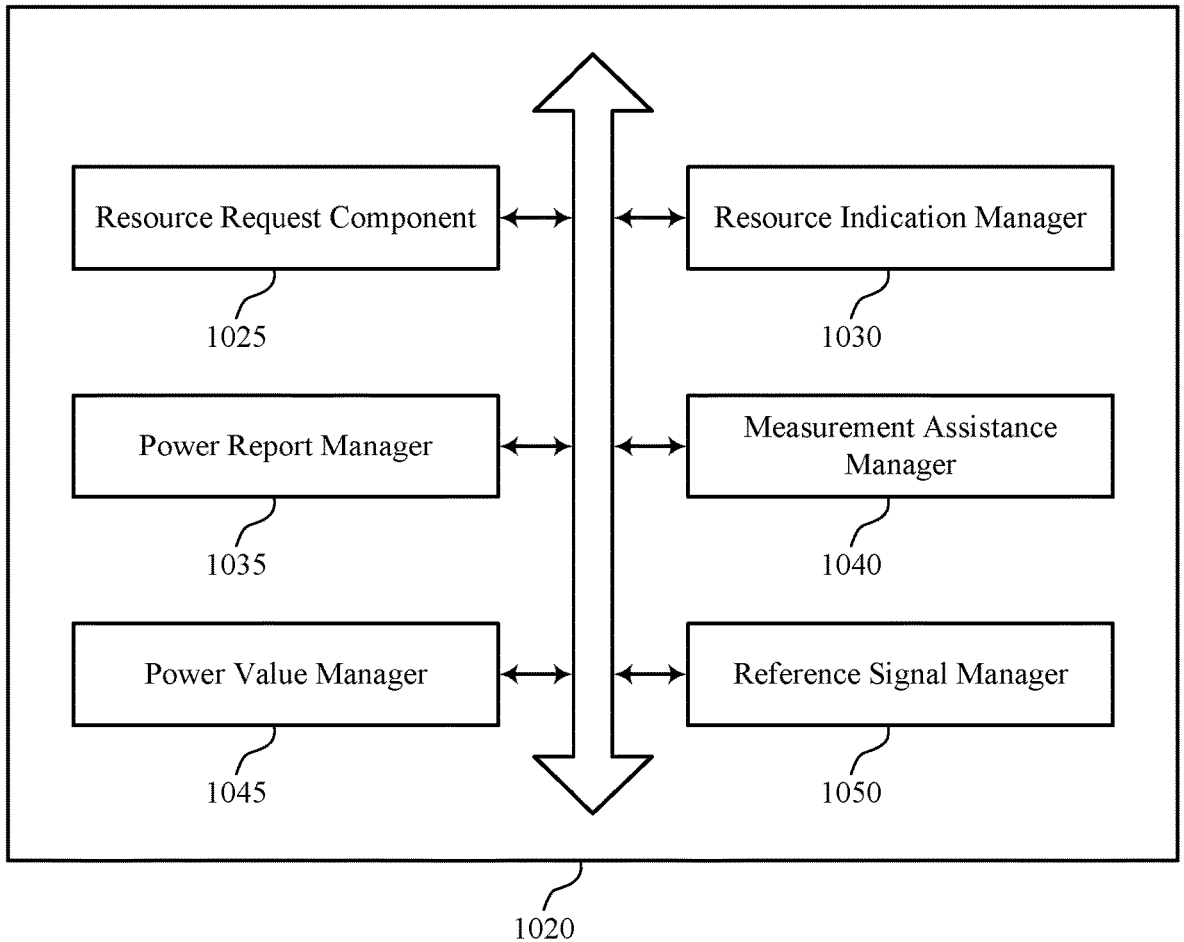
FIG. 10 shows a block diagram of a communications manager that supports power reporting for network power modification in accordance with aspects of the present disclosure.

FIG. 10 shows a block diagram 1000 of a communications manager 1020 that supports power reporting for network power modification in accordance with aspects of the present disclosure. The communications manager 1020 may be an example of aspects of a communications manager 820, a communications manager 920, or both, as described herein. The communications manager 1020, or various components thereof, may be an example of means for performing various aspects of power reporting for network power modification as described herein. For example, the communications manager 1020 may include a resource request component 1025, a resource indication manager 1030, a power report manager 1035, a measurement assistance manager 1040, a power value manager 1045, a reference signal manager 1050, or any combination thereof. Each of these components may communicate, directly or indirectly, with one another (e.g., via one or more buses).

The communications manager 1020 may support wireless communication at a network entity in accordance with examples as disclosed herein. The resource request component 1025 may be configured as or otherwise support a means for receiving, from a UE, a request for resources for performing channel measurements in accordance with a power reduction update associated with the UE. The resource indication manager 1030 may be configured as or otherwise support a means for allocating, to the UE, an indication of a set of resources in response to the request. The power report manager 1035 may be configured as or otherwise support a means for receiving, from the UE, a report that indicates one or more power parameters associated with the power reduction update based on one or more channel measurements at the UE.

In some examples, the measurement assistance manager 1040 may be configured as or otherwise support a means for receiving, from the UE, a request for measurement assistance information for performing the one or more channel measurements. In some examples, the measurement assistance manager 1040 may be configured as or otherwise support a means for transmitting, to the UE, the measurement assistance information in response to the request for measurement assistance information.

In some examples, to support receiving the request for measurement information, the measurement assistance manager 1040 may be configured as or otherwise support a means for receiving an indication of an information type of measurement assistance information, where the information type includes an EVM value, a SNR, IBE information, OBE information, ACI information, or any combination thereof.

In some examples, to support receiving the request for measurement information, the measurement assistance manager 1040 may be configured as or otherwise support a means for receiving an indication of the request for measurement assistance information using one or more bits in the request for resources for performing channel measurements in accordance with the power reduction update associated with the UE.

In some examples, to support transmitting the indication of the set of resources, the measurement assistance manager 1040 may be configured as or otherwise support a means for transmitting a number of resource blocks, a starting resource block, a power value, a modulation type, or any combination thereof based on the request for measurement assistance information.

In some examples, to support transmitting the indication of the set of resources, the measurement assistance manager 1040 may be configured as or otherwise support a means for transmitting an indication of a path fail criteria for one or more measurements of the measurement assistance information, where the one or more measurements correspond to an EVM value, a SNR, IBE information, OBE information, ACI information, or any combination thereof.

In some examples, the power value manager 1045 may be configured as or otherwise support a means for transmitting, in response to the report, an indication of one or more updated criteria for the UE, the one or more updated criteria based on the one or more power parameters.

In some examples, the one or more updated criteria correspond to an IBE criteria, an OBE criteria, an ACI criteria, or a combination thereof.

In some examples, the one or more updated criteria are based on a geographical location associated with the UE, a time of day, a network load, or any combination thereof.

In some examples, the reference signal manager 1050 may be configured as or otherwise support a means for transmitting, to the UE, one or more reference signals using the set of resources, where the one or more reference signals are periodic, aperiodic, or semi-persistent.

In some examples, the power report manager 1035 may be configured as or otherwise support a means for transmitting, to the UE, a signal indicating for the UE to use one or more default power parameters.

In some examples, to support receiving the request for resources, the resource request component 1025 may be configured as or otherwise support a means for receiving the request for resources in a MAC-CE, a PUCCH, or any combination thereof.

Figure 11:
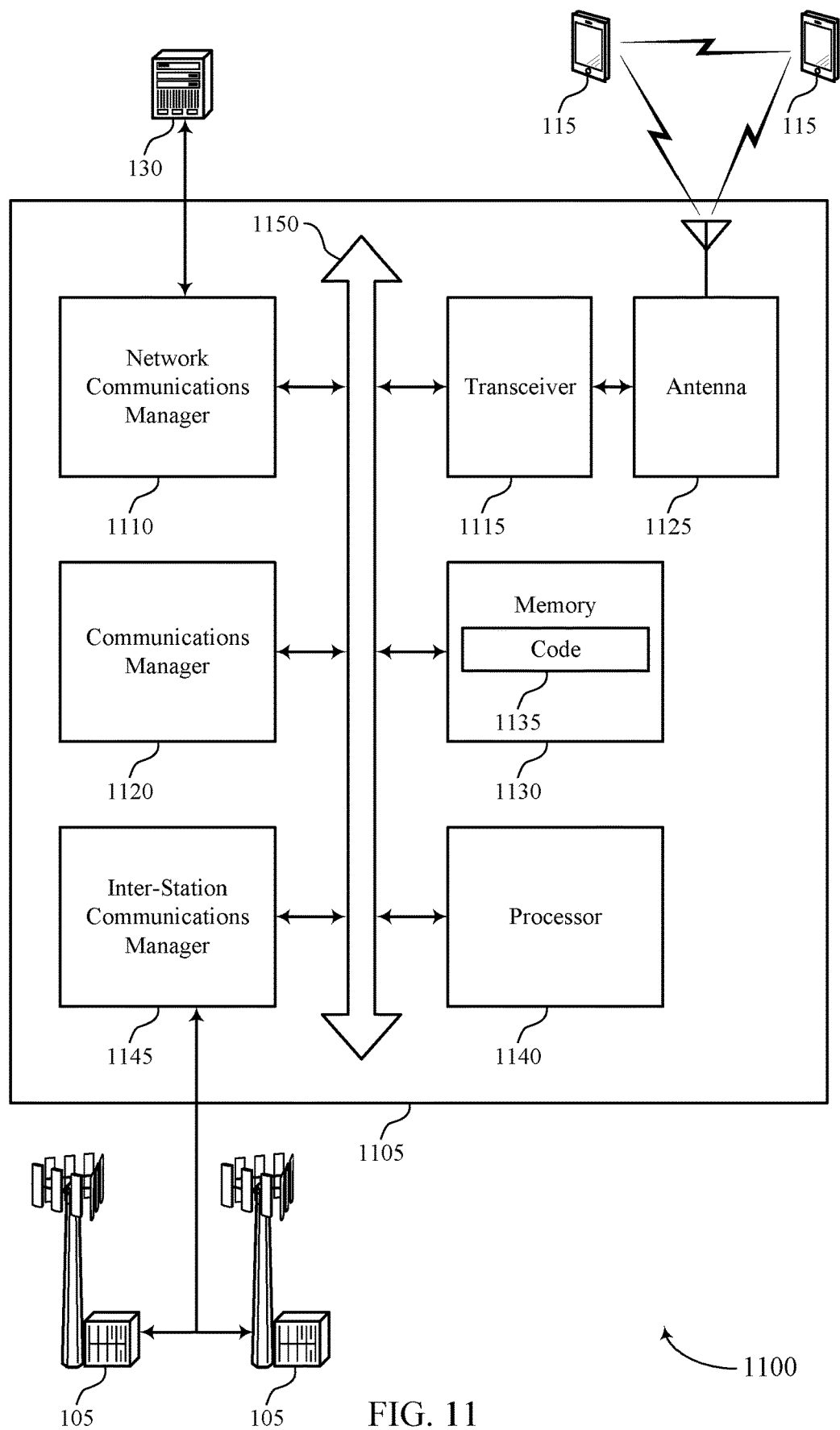
FIG. 11 shows a diagram of a system including a device that supports power reporting for network power modification in accordance with aspects of the present disclosure.

FIG. 11 shows a diagram of a system 1100 including a device 1105 that supports power reporting for network power modification in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting power reporting for network power modification). For example, the device 1105 or a component of the device 1105 may include a processor 1140 and memory 1130 coupled with or to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a network entity in accordance with examples as disclosed herein. For example, the communications manager 1120 may be configured as or otherwise support a means for receiving, from a UE, a request for resources for performing channel measurements in accordance with a power reduction update associated with the UE. The communications manager 1120 may be configured as or otherwise support a means for allocating, to the UE, an indication of a set of resources in response to the request. The communications manager 1120 may be configured as or otherwise support a means for receiving, from the UE, a report that indicates one or more power parameters associated with the power reduction update based on one or more channel measurements at the UE.

By including or configuring the communications manager 1120 in accordance with examples as described herein, the device 1105 may support techniques for an MPR update at a UE, resulting in improved communication reliability, reduced latency, more efficient utilization of communication resources, improved coordination between devices, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of power reporting for network power modification as described herein, or the processor 1140 and the memory 1130 may be otherwise configured to perform or support such operations.

Figure 12:
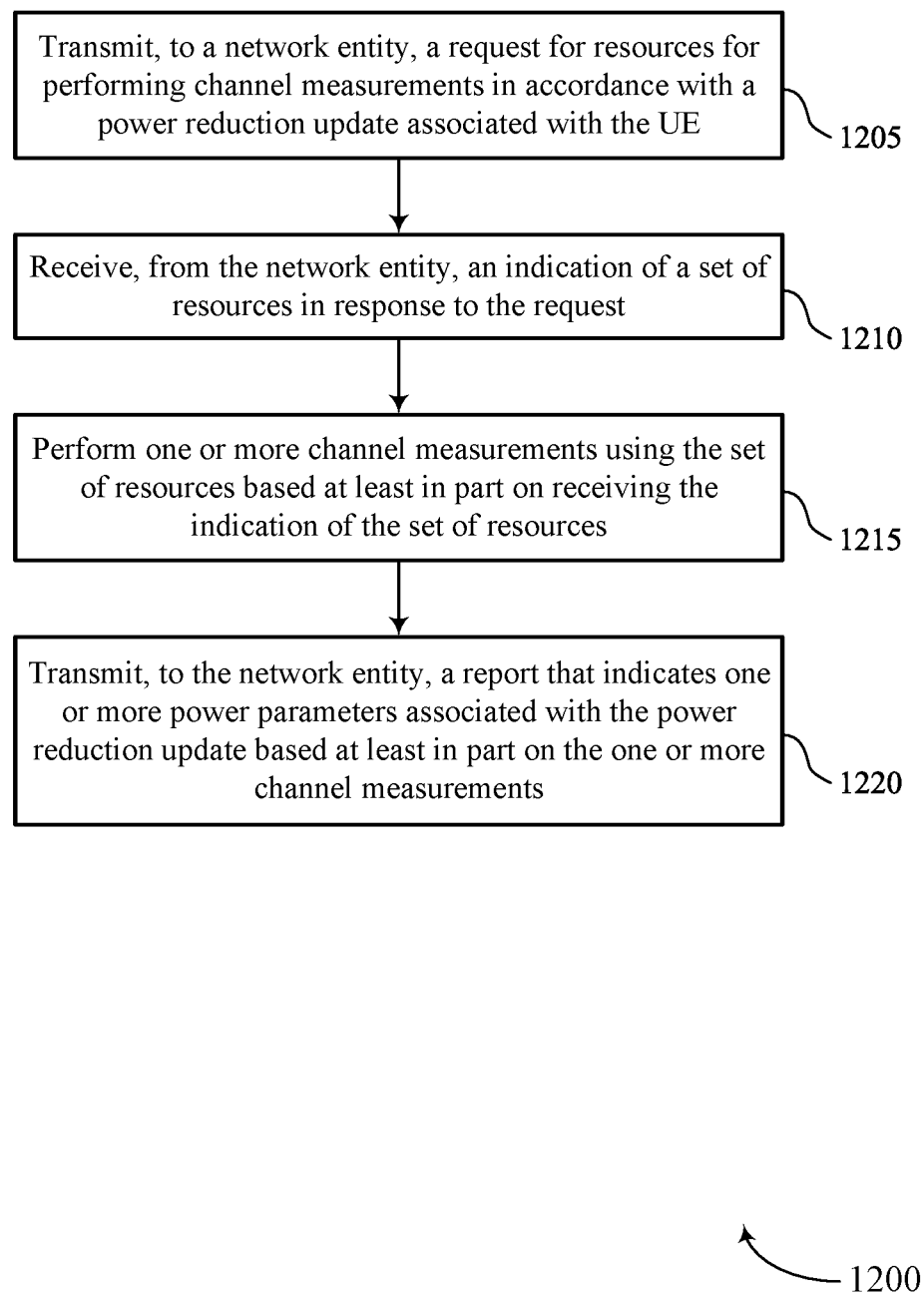
FIGS. 12 through 16 show flowcharts illustrating methods that support power reporting for network power modification in accordance with aspects of the present disclosure.

FIG. 12 shows a flowchart illustrating a method 1200 that supports power reporting for network power modification in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include transmitting, to a network entity, a request for resources for performing channel measurements in accordance with a power reduction update associated with the UE. The operations of 1205 may be performed in accordance with examples as disclosed herein. In some examples, aspects of the operations of 1205 may be performed by a resource request manager 625 as described with reference to FIG. 6.

At 1210, the method may include receiving, from the network entity, an indication of a set of resources in response to the request. The operations of 1210 may be performed in accordance with examples as disclosed herein. In some examples, aspects of the operations of 1210 may be performed by a resource indication component 630 as described with reference to FIG. 6.

At 1215, the method may include transmitting one or more signals using the set of resources based on receiving the indication of the set of resources. The operations of 1215 may be performed in accordance with examples as disclosed herein. In some examples, aspects of the operations of 1215 may be performed by a resource indication component 630 as described with reference to FIG. 6.

At 1220, the method may include performing one or more channel measurements using the set of resources based on receiving the indication of the set of resources. The operations of 1220 may be performed in accordance with examples as disclosed herein. In some examples, aspects of the operations of 1220 may be performed by a channel measurement manager 635 as described with reference to FIG. 6.

At 1225, the method may include transmitting, to the network entity, a report that indicates one or more power parameters associated with the power reduction update based on the one or more channel measurements. The operations of 1225 may be performed in accordance with examples as disclosed herein. In some examples, aspects of the operations of 1225 may be performed by a report manager 640 as described with reference to FIG. 6.

Figure 13:
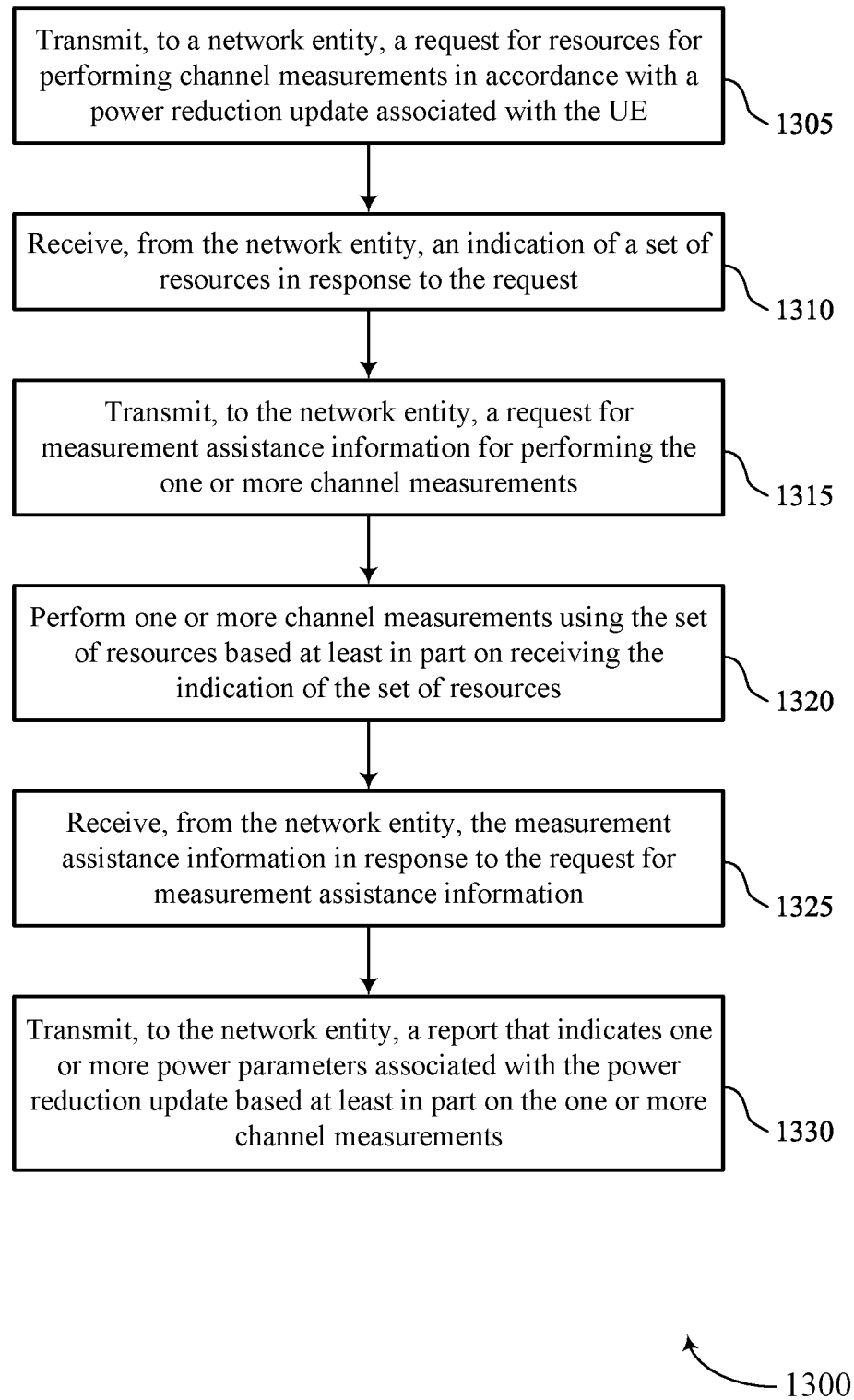

FIG. 13 shows a flowchart illustrating a method 1300 that supports power reporting for network power modification in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include transmitting, to a network entity, a request for resources for performing channel measurements in accordance with a power reduction update associated with the UE. The operations of 1305 may be performed in accordance with examples as disclosed herein. In some examples, aspects of the operations of 1305 may be performed by a resource request manager 625 as described with reference to FIG. 6.

At 1310, the method may include receiving, from the network entity, an indication of a set of resources in response to the request. The operations of 1310 may be performed in accordance with examples as disclosed herein. In some examples, aspects of the operations of 1310 may be performed by a resource indication component 630 as described with reference to FIG. 6.

At 1315, the method may include transmitting, to the network entity, a request for measurement assistance information for performing the one or more channel measurements. The operations of 1315 may be performed in accordance with examples as disclosed herein. In some examples, aspects of the operations of 1315 may be performed by a measurement assistance component 650 as described with reference to FIG. 6.

At 1320, the method may include transmitting one or more signals using the set of resources based on receiving the indication of the set of resources. The operations of 1320 may be performed in accordance with examples as disclosed herein. In some examples, aspects of the operations of 1320 may be performed by a resource indication component 630 as described with reference to FIG. 6.

At 1325, the method may include performing one or more channel measurements using the set of resources based on receiving the indication of the set of resources. The operations of 1325 may be performed in accordance with examples as disclosed herein. In some examples, aspects of the operations of 1325 may be performed by a channel measurement manager 635 as described with reference to FIG. 6.

At 1330, the method may include receiving, from the network entity, the measurement assistance information in response to the request for measurement assistance information. The operations of 1330 may be performed in accordance with examples as disclosed herein. In some examples, aspects of the operations of 1330 may be performed by a measurement assistance component 650 as described with reference to FIG. 6.

At 1335, the method may include transmitting, to the network entity, a report that indicates one or more power parameters associated with the power reduction update based on the one or more channel measurements. The operations of 1335 may be performed in accordance with examples as disclosed herein. In some examples, aspects of the operations of 1335 may be performed by a report manager 640 as described with reference to FIG. 6.

Figure 14:
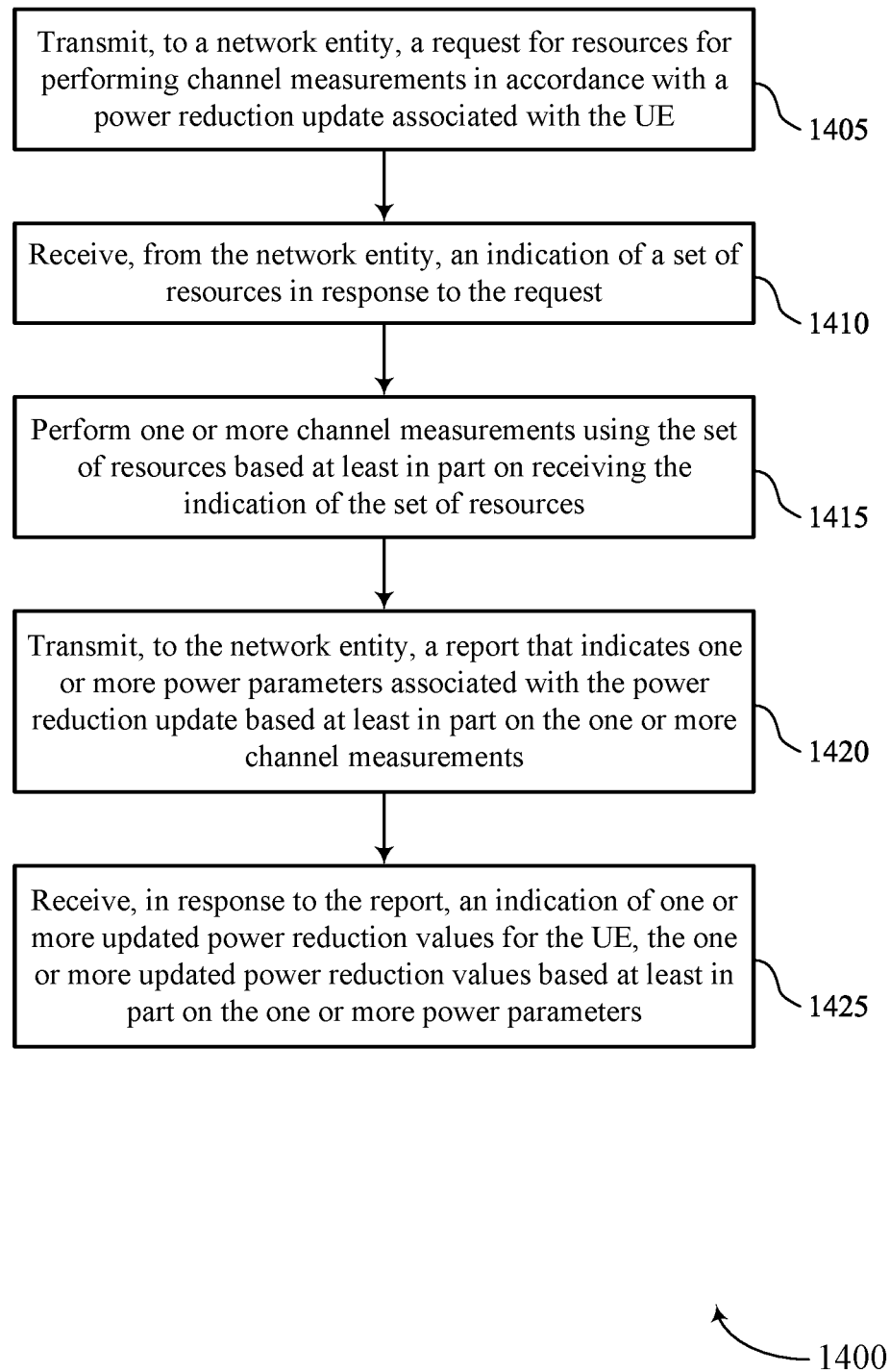

FIG. 14 shows a flowchart illustrating a method 1400 that supports power reporting for network power modification in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include transmitting, to a network entity, a request for resources for performing channel measurements in accordance with a power reduction update associated with the UE. The operations of 1405 may be performed in accordance with examples as disclosed herein. In some examples, aspects of the operations of 1405 may be performed by a resource request manager 625 as described with reference to FIG. 6.

At 1410, the method may include receiving, from the network entity, an indication of a set of resources in response to the request. The operations of 1410 may be performed in accordance with examples as disclosed herein. In some examples, aspects of the operations of 1410 may be performed by a resource indication component 630 as described with reference to FIG. 6.

At 1415, the method may include transmitting one or more signals using the set of resources based on receiving the indication of the set of resources. The operations of 1415 may be performed in accordance with examples as disclosed herein. In some examples, aspects of the operations of 1415 may be performed by a resource indication component 630 as described with reference to FIG. 6.

At 1420, the method may include performing one or more channel measurements using the set of resources based on receiving the indication of the set of resources. The operations of 1420 may be performed in accordance with examples as disclosed herein. In some examples, aspects of the operations of 1420 may be performed by a channel measurement manager 635 as described with reference to FIG. 6.

At 1425, the method may include transmitting, to the network entity, a report that indicates one or more power parameters associated with the power reduction update based on the one or more channel measurements. The operations of 1425 may be performed in accordance with examples as disclosed herein. In some examples, aspects of the operations of 1425 may be performed by a report manager 640 as described with reference to FIG. 6.

At 1430, the method may include receiving, in response to the report, an indication of one or more updated criteria for the UE, the one or more updated criteria based on the one or more power parameters. The operations of 1430 may be performed in accordance with examples as disclosed herein. In some examples, aspects of the operations of 1430 may be performed by a power value manager 655 as described with reference to FIG. 6.

Figure 15:
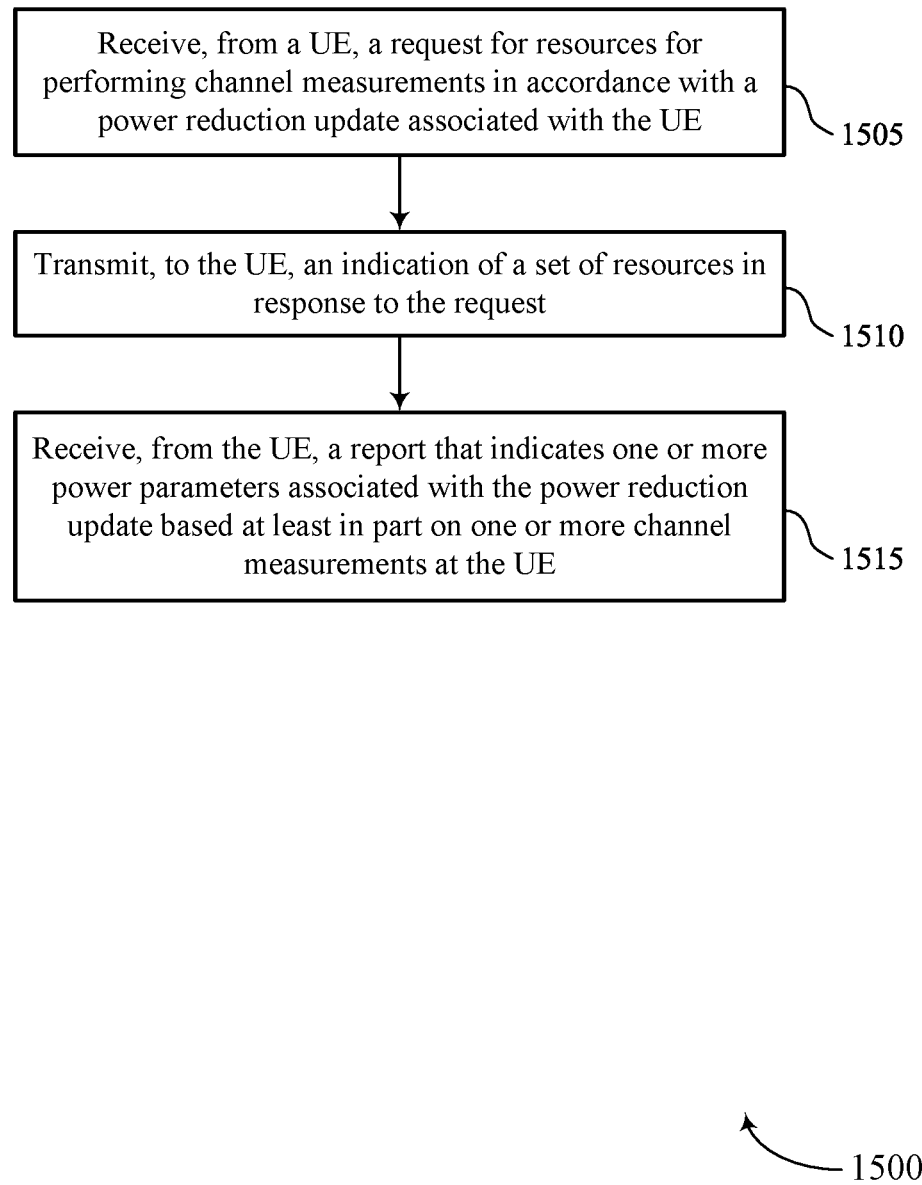

FIG. 15 shows a flowchart illustrating a method 1500 that supports power reporting for network power modification in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, a request for resources for performing channel measurements in accordance with a power reduction update associated with the UE. The operations of 1505 may be performed in accordance with examples as disclosed herein. In some examples, aspects of the operations of 1505 may be performed by a resource request component 1025 as described with reference to FIG. 10.

At 1510, the method may include allocating, to the UE, an indication of a set of resources in response to the request. The operations of 1510 may be performed in accordance with examples as disclosed herein. In some examples, aspects of the operations of 1510 may be performed by a resource indication manager 1030 as described with reference to FIG. 10.

At 1515, the method may include receiving, from the UE, a report that indicates one or more power parameters associated with the power reduction update based on one or more channel measurements at the UE. The operations of 1515 may be performed in accordance with examples as disclosed herein. In some examples, aspects of the operations of 1515 may be performed by a power report manager 1035 as described with reference to FIG. 10.

Figure 16:
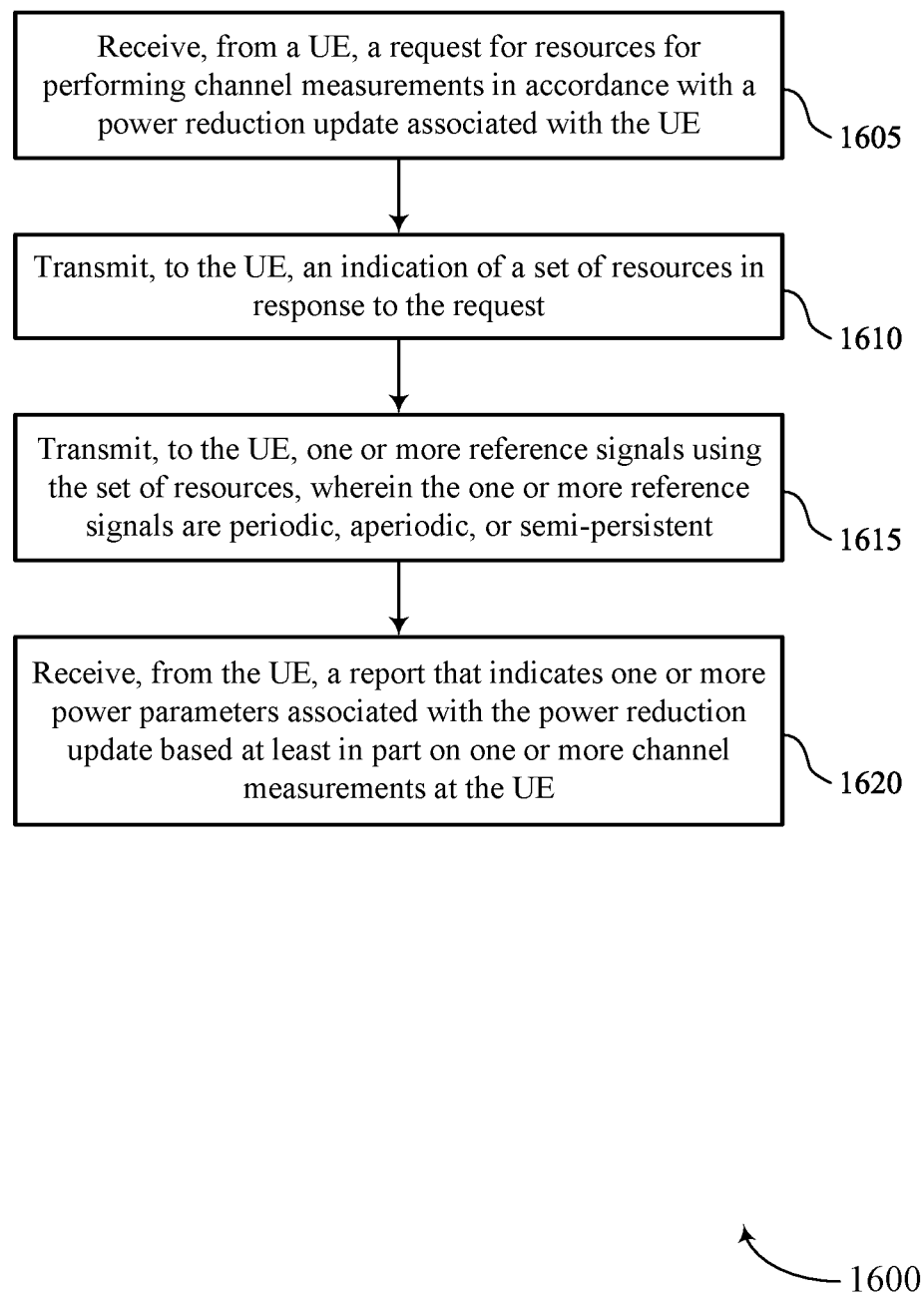

FIG. 16 shows a flowchart illustrating a method 1600 that supports power reporting for network power modification in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, a request for resources for performing channel measurements in accordance with a power reduction update associated with the UE. The operations of 1605 may be performed in accordance with examples as disclosed herein. In some examples, aspects of the operations of 1605 may be performed by a resource request component 1025 as described with reference to FIG. 10.

At 1610, the method may include allocating, to the UE, an indication of a set of resources in response to the request. The operations of 1610 may be performed in accordance with examples as disclosed herein. In some examples, aspects of the operations of 1610 may be performed by a resource indication manager 1030 as described with reference to FIG. 10.

At 1615, the method may include transmitting, to the UE, one or more reference signals using the set of resources, where the one or more reference signals are periodic, aperiodic, or semi-persistent. The operations of 1615 may be performed in accordance with examples as disclosed herein. In some examples, aspects of the operations of 1615 may be performed by a reference signal manager 1050 as described with reference to FIG. 10.

At 1620, the method may include receiving, from the UE, a report that indicates one or more power parameters associated with the power reduction update based on one or more channel measurements at the UE. The operations of 1620 may be performed in accordance with examples as disclosed herein. In some examples, aspects of the operations of 1620 may be performed by a power report manager 1035 as described with reference to FIG. 10.

The following provides an overview of aspects of the present disclosure:

Aspect 1: A method for wireless communication at a UE, comprising: transmitting, to a network entity, a request for resources for performing channel measurements in accordance with a power reduction update associated with the UE; receiving, from the network entity, an indication of a set of resources in response to the request; performing one or more channel measurements using the set of resources based at least in part on receiving the indication of the set of resources; and transmitting, to the network entity, a report that indicates one or more power parameters associated with the power reduction update based at least in part on the one or more channel measurements.

Aspect 2: The method of aspect 1, further comprising: transmitting, to the network entity, a request for measurement assistance information for performing the one or more channel measurements; and receiving, from the network entity, the measurement assistance information in response to the request for measurement assistance information.

Aspect 3: The method of aspect 2, wherein transmitting the request for measurement assistance information comprises: transmitting an indication of an information type of measurement assistance information, wherein the information type comprises an error vector magnitude value, a signal to noise ratio, in-band emission information, out-of-band emission information, adjacent channel interference information, or any combination thereof.

Aspect 4: The method of any of aspects 2 through 3, wherein transmitting the request for measurement assistance information comprises: transmitting an indication of the request for measurement assistance information using one or more bits in the request for resources for performing channel measurements in accordance with the power reduction update associated with the UE.

Aspect 5: The method of any of aspects 2 through 4, wherein receiving the measurement assistance information comprises: receiving resource allocation information for the set of resources in the measurement assistance information, wherein the resource allocation information comprises a number of resource blocks, a starting resource block, a power value, a modulation type, or any combination thereof.

Aspect 6: The method of any of aspects 2 through 5, wherein receiving the measurement assistance information comprises: receiving an indication of a pass-fail criteria for one or more measurements of the measurement assistance information.

Aspect 7: The method of any of aspects 1 through 6, further comprising: receiving, in response to the report, an indication of one or more updated power reduction values for the UE, the one or more updated power reduction values based at least in part on the one or more power parameters.

Aspect 8: The method of aspect 7, wherein the one or more updated power reduction values are based at least in part on a geographical location associated with the UE, a time of day, a network load, or any combination thereof.

Aspect 9: The method of any of aspects 1 through 8, further comprising: receiving, from the network entity, a message indicating a configuration for performing channel measurements in accordance with the power reduction update associated with the UE; and selecting, based at least in part on the configuration, a subset of the set of resources for performing the one or more channel measurements.

Aspect 10: The method of any of aspects 1 through 9, further comprising: performing a part-to-part calibration of the UE to obtain a power reduction table based at least in part on performing one or more channel measurements.

Aspect 11: The method of any of aspects 1 through 10, wherein performing the one or more channel measurements using the set of resources comprises: receiving, from the network entity, one or more reference signals using the set of resources, wherein the one or more reference signals are periodic, aperiodic, or semi-persistent.

Aspect 12: The method of any of aspects 1 through 11, wherein transmitting the request for resources comprises: transmitting the request for resources in a medium access control (MAC) control element (MAC-CE), a PUCCH, or any combination thereof.

Aspect 13: A method for wireless communication at a network entity, comprising: receiving, from a UE, a request for resources for performing channel measurements in accordance with a power reduction update associated with the UE; transmitting, to the UE, an indication of a set of resources in response to the request; and receiving, from the UE, a report that indicates one or more power parameters associated with the power reduction update based at least in part on one or more channel measurements at the UE.

Aspect 14: The method of aspect 13, further comprising: receiving, from the UE, a request for measurement assistance information for performing the one or more channel measurements; and transmitting, to the UE, the measurement assistance information in response to the request for measurement assistance information.

Aspect 15: The method of aspect 14, wherein receiving the request for measurement information comprises: receiving an indication of an information type of measurement assistance information, wherein the information type comprises an error vector magnitude value, a signal to noise ratio, in-band emission information, out-of-band emission information, adjacent channel interference information, or any combination thereof.

Aspect 16: The method of any of aspects 14 through 15, wherein receiving the request for measurement information comprises: receiving an indication of the request for measurement assistance information using one or more bits in the request for resources for performing channel measurements in accordance with the power reduction update associated with the UE.

Aspect 17: The method of any of aspects 14 through 16, wherein transmitting the measurement assistance information comprises: transmitting resource allocation information for the set of resources in the measurement assistance information, wherein the resource allocation information comprises a number of resource blocks, a starting resource block, a power value, a modulation type, or any combination thereof.

Aspect 18: The method of any of aspects 14 through 17, wherein transmitting the measurement assistance information comprises: transmitting an indication of a pass-fail criteria for one or more measurements of the measurement assistance information.

Aspect 19: The method of any of aspects 13 through 18, further comprising: transmitting, in response to the report, an indication of one or more updated power reduction values for the UE, the one or more updated power reduction values based at least in part on the one or more power parameters.

Aspect 20: The method of aspect 19, wherein the one or more updated power reduction values are based at least in part on a geographical location associated with the UE, a time of day, a network load, or any combination thereof.

Aspect 21: The method of any of aspects 13 through 20, further comprising: transmitting, to the UE, one or more reference signals using the set of resources, wherein the one or more reference signals are periodic, aperiodic, or semi-persistent.

Aspect 22: The method of any of aspects 13 through 21, wherein receiving the request for resources comprises: receiving the request for resources in a medium access control (MAC) control element (MAC-CE), a PUCCH, or any combination thereof.

Aspect 23: An apparatus for wireless communication at a UE, comprising a processor; memory coupled with the processor; and instructions stored in the memory and executable by the processor to cause the apparatus to perform a method of any of aspects 1 through 12.

Aspect 24: An apparatus for wireless communication at a UE, comprising at least one means for performing a method of any of aspects 1 through 12.

Aspect 25: A non-transitory computer-readable medium storing code for wireless communication at a UE, the code comprising instructions executable by a processor to perform a method of any of aspects 1 through 12.

Aspect 26: An apparatus for wireless communication at a network entity, comprising a processor; memory coupled with the processor; and instructions stored in the memory and executable by the processor to cause the apparatus to perform a method of any of aspects 13 through 22.

Aspect 27: An apparatus for wireless communication at a network entity, comprising at least one means for performing a method of any of aspects 13 through 22.

Aspect 28: A non-transitory computer-readable medium storing code for wireless communication at a network entity, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting, to a network entity, a request for resources for performing channel measurements in accordance with a power reduction update associated with the UE;
    receiving, from the network entity, an indication of a set of resources in response to the request;
    transmitting one or more signals using the set of resources based at least in part on receiving the indication of the set of resources;
    performing one or more channel measurements using the set of resources based at least in part on receiving the indication of the set of resources; and
    transmitting, to the network entity, a report that indicates one or more power parameters associated with the power reduction update based at least in part on the one or more channel measurements.

2. The method of claim 1, further comprising:
    performing a part-to-part calibration of the UE to obtain a power reduction table based at least in part on performing one or more channel measurements.

3. The method of claim 1, further comprising:
    transmitting, to the network entity, a request for measurement assistance information for performing the one or more channel measurements; and
    receiving, from the network entity, the measurement assistance information in response to the request for measurement assistance information.

4. The method of claim 3, wherein transmitting the request for measurement assistance information comprises:
    transmitting an indication of an information type of measurement assistance information, wherein the information type comprises an error vector magnitude value, a signal to noise ratio, in-band emission information, out-of-band emission information, adjacent channel interference information, or any combination thereof.

5. The method of claim 3, wherein transmitting the request for measurement assistance information comprises:
transmitting an indication of the request for measurement assistance information using one or more bits in the request for resources for performing channel measurements in accordance with the power reduction update associated with the UE.

6. The method of claim 3, wherein receiving the indication of the set of resources comprises:
receiving a number of resource blocks, a starting resource block, a power value, a modulation type, or any combination thereof based at least in part on the request for measurement assistance information.

7. The method of claim 3, wherein receiving the measurement assistance information comprises:
receiving an indication of a path fail criteria for one or more measurements of the measurement assistance information, wherein the one or more measurements correspond to an error vector magnitude value, a signal to noise ratio, in-band emission information, out-of-band emission information, adjacent channel interference information, or any combination thereof.

8. The method of claim 1, further comprising:
receiving, in response to the report, an indication of one or more updated criteria for the UE, the one or more updated criteria based at least in part on the one or more power parameters.

9. The method of claim 8, wherein the one or more updated criteria correspond to an correspond to an in-band emission criteria, an out-of-band criteria, an adjacent channel interference criteria, or a combination thereof.

10. The method of claim 8, wherein the one or more updated criteria are based at least in part on a geographical location associated with the UE, a time of day, a network load, or any combination thereof.

11. The method of claim 1, further comprising:
receiving, from the network entity, a message indicating a configuration for performing channel measurements in accordance with the power reduction update associated with the UE; and
selecting, based at least in part on the configuration, a subset of the set of resources for performing the one or more channel measurements.

12. The method of claim 1, further comprising:
receiving, from the network entity, a signal indicating for the UE to use one or more default power parameters.

13. The method of claim 1, wherein transmitting the request for resources comprises:
transmitting the request for resources in a medium access control (MAC) control element (MAC-CE), a physical uplink control channel (PUCCH), or any combination thereof.

14. A method for wireless communication at a network entity, comprising:
receiving, from a user equipment (UE), a request for resources for performing channel measurements in accordance with a power reduction update associated with the UE;
allocating, to the UE, an indication of a set of measurement resources in response to the request; and
receiving, from the UE, a report that indicates one or more power parameters associated with the power reduction update based at least in part on one or more channel measurements using the set of measurement resources at the UE.

15. The method of claim 14, further comprising:
receiving, from the UE, a request for measurement assistance information for performing the one or more channel measurements; and
transmitting, to the UE, the measurement assistance information in response to the request for measurement assistance information.

16. The method of claim 15, wherein receiving the request for measurement information comprises:
receiving an indication of an information type of measurement assistance information, wherein the information type comprises an error vector magnitude value, a signal to noise ratio, in-band emission information, out-of-band emission information, adjacent channel interference information, or any combination thereof.

17. The method of claim 15, wherein receiving the request for measurement information comprises:
receiving an indication of the request for measurement assistance information using one or more bits in the request for resources for performing channel measurements in accordance with the power reduction update associated with the UE.

18. The method of claim 15, wherein transmitting the indication of the set of resources comprises:
transmitting a number of resource blocks, a starting resource block, a power value, a modulation type, or any combination thereof based at least in part on the request for measurement assistance information.

19. The method of claim 15, wherein transmitting the indication of the set of resources comprises:
transmitting an indication of a path fail criteria for one or more measurements of the measurement assistance information, wherein the one or more measurements correspond to an error vector magnitude value, a signal to noise ratio, in-band emission information, out-of-band emission information, adjacent channel interference information, or any combination thereof.

20. The method of claim 14, further comprising:
transmitting, in response to the report, an indication of one or more updated criteria for the UE, the one or more updated criteria based at least in part on the one or more power parameters.

21. The method of claim 20, wherein the one or more updated criteria correspond to an in-band emission criteria, an out-of-band emission criteria, an adjacent channel interference criteria, or a combination thereof.

22. The method of claim 20, wherein the one or more updated criteria are based at least in part on a geographical location associated with the UE, a time of day, a network load, or any combination thereof.

23. The method of claim 14, further comprising:
transmitting, to the UE, one or more reference signals using the set of resources, wherein the one or more reference signals are periodic, aperiodic, or semi-persistent.

24. The method of claim 14, further comprising:
transmitting, to the UE, a signal indicating for the UE to use one or more default power parameters.

25. The method of claim 14, wherein receiving the request for resources comprises:
receiving the request for resources in a medium access control (MAC) control element (MAC-CE), a physical uplink control channel (PUCCH), or any combination thereof.

26. An apparatus for wireless communication at a user equipment (UE), comprising:
a processor;
memory coupled with the processor; and
instructions stored in the memory and executable by the processor to cause the apparatus to:
transmit, to a network entity, a request for resources for performing channel measurements in accordance with a power reduction update associated with the UE;
receive, from the network entity, an indication of a set of resources in response to the request;
transmit one or more signals using the set of resources based at least in part on receiving the indication of the set of resources;
perform one or more channel measurements using the set of resources based at least in part on receiving the indication of the set of resources; and
transmit, to the network entity, a report that indicates one or more power parameters associated with the power reduction update based at least in part on the one or more channel measurements.

27. The apparatus of claim 26, wherein the instructions are further executable by the processor to cause the apparatus to:
perform a part-to-part calibration of the UE to obtain a power reduction table based at least in part on performing one or more channel measurements.

28. The apparatus of claim 26, wherein the instructions are further executable by the processor to cause the apparatus to:
transmit, to the network entity, a request for measurement assistance information for performing the one or more channel measurements; and
receive, from the network entity, the measurement assistance information in response to the request for measurement assistance information.

29. An apparatus for wireless communication at a network entity, comprising:
a processor;
memory coupled with the processor; and
instructions stored in the memory and executable by the processor to cause the apparatus to:
receive, from a user equipment (UE), a request for resources for performing channel measurements in accordance with a power reduction update associated with the UE;
allocate, to the UE, an indication of a set of measurement resources in response to the request; and
receive, from the UE, a report that indicates one or more power parameters associated with the power reduction update based at least in part on one or more channel measurements using the set of measurement resources at the UE.

30. The apparatus of claim 29, wherein the instructions are further executable by the processor to cause the apparatus to:
receive, from the UE, a request for measurement assistance information for performing the one or more channel measurements; and
transmit, to the UE, the measurement assistance information in response to the request for measurement assistance information.

* * * * *